US012360294B2

(12) United States Patent
Deore et al.

(10) Patent No.: US 12,360,294 B2
(45) Date of Patent: Jul. 15, 2025

(54) 3D PRINTED GRADED REFRACTIVE INDEX DEVICE

(71) Applicant: National Research Council of Canada, Ottawa (CA)

(72) Inventors: Bhavana Deore, Ottawa (CA); Chantal Paquet, Ottawa (CA); Thomas Lacelle, Ottawa (CA); Patrick Roland Lucien Malenfant, Ottawa (CA); Rony Amaya, Kanata (CA); Joseph Hyland, Ottawa (CA)

( * ) Notice: Subject to any disclaimer, the term of this patent is extended or adjusted under 35 U.S.C. 154(b) by 345 days.

(21) Appl. No.: 17/635,762

(22) PCT Filed: Aug. 26, 2020

(86) PCT No.: PCT/IB2020/057978
§ 371 (c)(1),
(2) Date: Feb. 16, 2022

(87) PCT Pub. No.: WO2021/044260
PCT Pub. Date: Mar. 11, 2021

(65) Prior Publication Data
US 2022/0334291 A1    Oct. 20, 2022

Related U.S. Application Data

(63) Continuation-in-part of application No. PCT/IB2019/058923, filed on Oct. 18, 2019.
(Continued)

(30) Foreign Application Priority Data

Oct. 18, 2019  (WO) .................. PCT/IB2019/058923

(51) Int. Cl.
*G02B 3/00*    (2006.01)
*B29C 64/124*  (2017.01)
(Continued)

(52) U.S. Cl.
CPC .......... *G02B 3/0087* (2013.01); *B29C 64/124* (2017.08); *B29D 11/00355* (2013.01);
(Continued)

(58) Field of Classification Search
CPC ....... B29C 64/124; B33Y 10/00; B33Y 80/00; G02B 3/0087; G02B 1/04; B29D 11/0355
See application file for complete search history.

(56) References Cited

U.S. PATENT DOCUMENTS 4,861,835 A * 8/1989 Maeda .................... C08L 33/04
                                                          428/394
5,783,636 A    7/1998 Koike et al.
(Continued)

FOREIGN PATENT DOCUMENTS

CN        1409128 A     4/2003
CN       104955633 A    9/2015
(Continued)

OTHER PUBLICATIONS

International Search Report and Written Opinion dated Nov. 23, 2020 on PCT application PCT/IB2020/057978 filed Aug. 26, 2020.
(Continued)

*Primary Examiner* — Nahida Sultana
(74) *Attorney, Agent, or Firm* — Brunet & Co. Ltd.; Hans Koenig; Robert Brunet

(57) ABSTRACT

A 3D printed GRIN device, the formulation and the method for making the GRIN device are disclosed. The GRIN (graded-index) device comprises i) a first phase comprising at least one polymer; ii) a second phase comprising at least one first component; and, optionally, iii) an interface between the first phase and the second phase, wherein the interface has a concentration gradient of the at least one first component, whereby the concentration of the at least one first component decreases with distance away from the
(Continued)

second phase towards the first phase, wherein the at least one first component comprises at least one functional component, at least one functional precursor component, or combinations thereof, and wherein the GRIN device is a functional GRIN device, a functional precursor GRIN device, or a combination of a functional and functional precursor GRIN device.

14 Claims, 19 Drawing Sheets

Related U.S. Application Data

(60) Provisional application No. 62/923,103, filed on Oct. 18, 2019, provisional application No. 62/923,043, filed on Oct. 18, 2019, provisional application No. 62/923,136, filed on Oct. 18, 2019, provisional application No. 62/895,218, filed on Sep. 3, 2019.

(51) Int. Cl.
| | |
|---|---|
| B29D 11/00 | (2006.01) |
| B29K 33/00 | (2006.01) |
| B33Y 10/00 | (2015.01) |
| B33Y 80/00 | (2015.01) |
| C08F 2/50 | (2006.01) |
| C08F 22/18 | (2006.01) |
| G02B 1/04 | (2006.01) |
| H01Q 9/04 | (2006.01) |
| H01Q 15/02 | (2006.01) |

(52) U.S. Cl.
CPC ............... *B33Y 10/00* (2014.12); *B33Y 80/00* (2014.12); *C08F 2/50* (2013.01); *C08F 22/18* (2013.01); *G02B 1/04* (2013.01); *H01Q 9/04* (2013.01); *H01Q 15/02* (2013.01); *B29K 2033/08* (2013.01)

(56) References Cited

U.S. PATENT DOCUMENTS

| | | | |
|---|---|---|---|
| 6,027,672 A | 2/2000 | Weitzel et al. | |
| 6,136,234 A | 10/2000 | Liu et al. | |
| 7,002,754 B2 | 2/2006 | Baer et al. | |
| 7,374,807 B2 | 5/2008 | Parce et al. | |
| 7,463,214 B2 | 12/2008 | Winsor et al. | |
| 7,570,432 B1 | 8/2009 | Yonak | |
| 8,300,294 B2 | 10/2012 | Wu et al. | |
| 9,447,299 B2* | 9/2016 | Schut | G02B 1/041 |
| 9,644,107 B2 | 5/2017 | Williams | |
| 9,771,490 B2 | 9/2017 | Weber et al. | |
| 10,310,146 B2 | 6/2019 | Williams | |
| 11,448,798 B1* | 9/2022 | Ouderkirk | H10N 30/2023 |
| 2004/0265737 A1* | 12/2004 | Hanamura | G03F 7/0757 |
| | | | 264/1.21 |
| 2006/0139763 A1* | 6/2006 | Satzke | G02B 6/32 |
| | | | 359/652 |
| 2015/0023643 A1* | 1/2015 | Chartoff | C09D 11/101 |
| | | | 385/124 |
| 2015/0137404 A1* | 5/2015 | Tuchinskiy | B22F 7/06 |
| | | | 264/642 |
| 2015/0361286 A1* | 12/2015 | Williams | G02B 3/0087 |
| | | | 359/356 |
| 2015/0362707 A1* | 12/2015 | Sanghera | G02B 13/143 |
| | | | 359/356 |
| 2016/0304402 A1 | 10/2016 | Kriven et al. | |
| 2017/0080459 A1* | 3/2017 | Williams | C09D 11/03 |
| 2017/0162133 A1* | 6/2017 | Sekiguchi | G02B 6/00 |
| 2017/0173957 A1 | 6/2017 | Williams et al. | |
| 2017/0297953 A1 | 10/2017 | Dupuy et al. | |
| 2018/0143147 A1 | 5/2018 | Milner et al. | |
| 2018/0147871 A1* | 5/2018 | Landa | B41J 2/0057 |
| 2018/0217411 A1 | 8/2018 | Karlsen et al. | |
| 2018/0356642 A1 | 12/2018 | Leger et al. | |
| 2019/0033719 A1 | 1/2019 | Cole | |
| 2019/0039294 A1* | 2/2019 | Stasiak | C09D 7/61 |
| 2019/0056537 A1 | 2/2019 | Fein et al. | |
| 2019/0137664 A1* | 5/2019 | Stasiak | C09D 11/38 |
| 2019/0257943 A1 | 8/2019 | Beers | |
| 2019/0277475 A1 | 9/2019 | Hikmet et al. | |
| 2019/0330482 A1* | 10/2019 | Williams | H10D 62/882 |
| 2020/0301048 A1* | 9/2020 | Goeckeritz | C03C 21/002 |
| 2020/0353682 A1* | 11/2020 | Fedynyshyn | H01F 41/02 |

FOREIGN PATENT DOCUMENTS

| | | |
|---|---|---|
| CN | 105873744 A | 8/2016 |
| CN | 108274738 A | 7/2018 |
| WO | 2016/094706 A1 | 6/2016 |
| WO | 2017/106341 A1 | 6/2017 |

OTHER PUBLICATIONS

Dogan E, et al. Optoelectronics and Advanced Materials—Rapid Communications. vol. 7, No. 11-12, (2013) 1002-1010.
Du G. IEEE Antennas and Wireless Propagation Letters. vol. 15, (2016) 1487-1490.
Gbele K, et al. Millimeter Wave Luneburg Lens Antenna Fabricated by Polymer Jetting Rapid Prototyping. IEEE Xplore (2014).
Abstract of Hernandez-Serrano Al, et al. Josa B. (2016) 33(5), 928.
Isakov D, et al. Advanced Materials Technologies, (2016) 1(6):1600072 (DOI:10.1002/admt.201600072).
Liang M, et al. Direction of arrival estimation using Luneburg lens. IEEE Xplore (2012).
Liang M, et al. Broadband Electronically Beam Scanning Structure Using Luneburg Lens. IEEE Xplore (2013).
Liang M, et al. Electromagnetic materials of artificially controlled properties for 3D printing applications. IEEE Xplore (2014).
Liang M, et al. IEEE Transactions on Antennas and Propagation. (2014) vol. 62, No. 4, 1799-1807.
Liang M, et al. Design of additive manufacturing Lunenberg Lens working at W-band. IEEE Xplore (2015).
O'Brien J, et al. Miniaturization of Microwave Components and Antennas Using 3D Manufacturing. IEEE Xplore (2015).
Pan C-W, et al. Microwave Focusing Lenses by Synthesized with Positive or Negative Refractive Index Split-Ring Resonator Metamaterials. IEEE Xplore (2015).
Rotman W, et al. Wide-Angle Microwave lens for Line Source Applications. IEEE Transactions on Antennas and Propagation. (1963) 623-632, IEEE Xplore.
Tudosie G, et al. An LTCC-Based Folded Rotman Lens for Phased Array Applications. Proceedings of Asia-Pacific Microwave Conference, 2006.
Turalchuk P, et al. Analog Beamforming based on Fourier Rotman Lens for Multibeam Applications. Proceedings of the 48th European Microwave Conference (2018).
Werner D, et al. Gradient-Index Lens Design with Quasi-conformal Transformation Optics for Energy Concentration. Proc. of SPIE vol. 8834, 88340F-1-10.
Split-Ring Resonator. Wikipedia. (2020).
Xin H, et al. 3D Printed Microwave and THz Devices using Polymer-Jetting Techniques. Proceedings of the IEEE (2016).
Office Action dated Jun. 20, 2024 on Taiwan patent application 109129835.
Office Action dated Nov. 27, 2024 on Taiwan patent application 109129835.

* cited by examiner

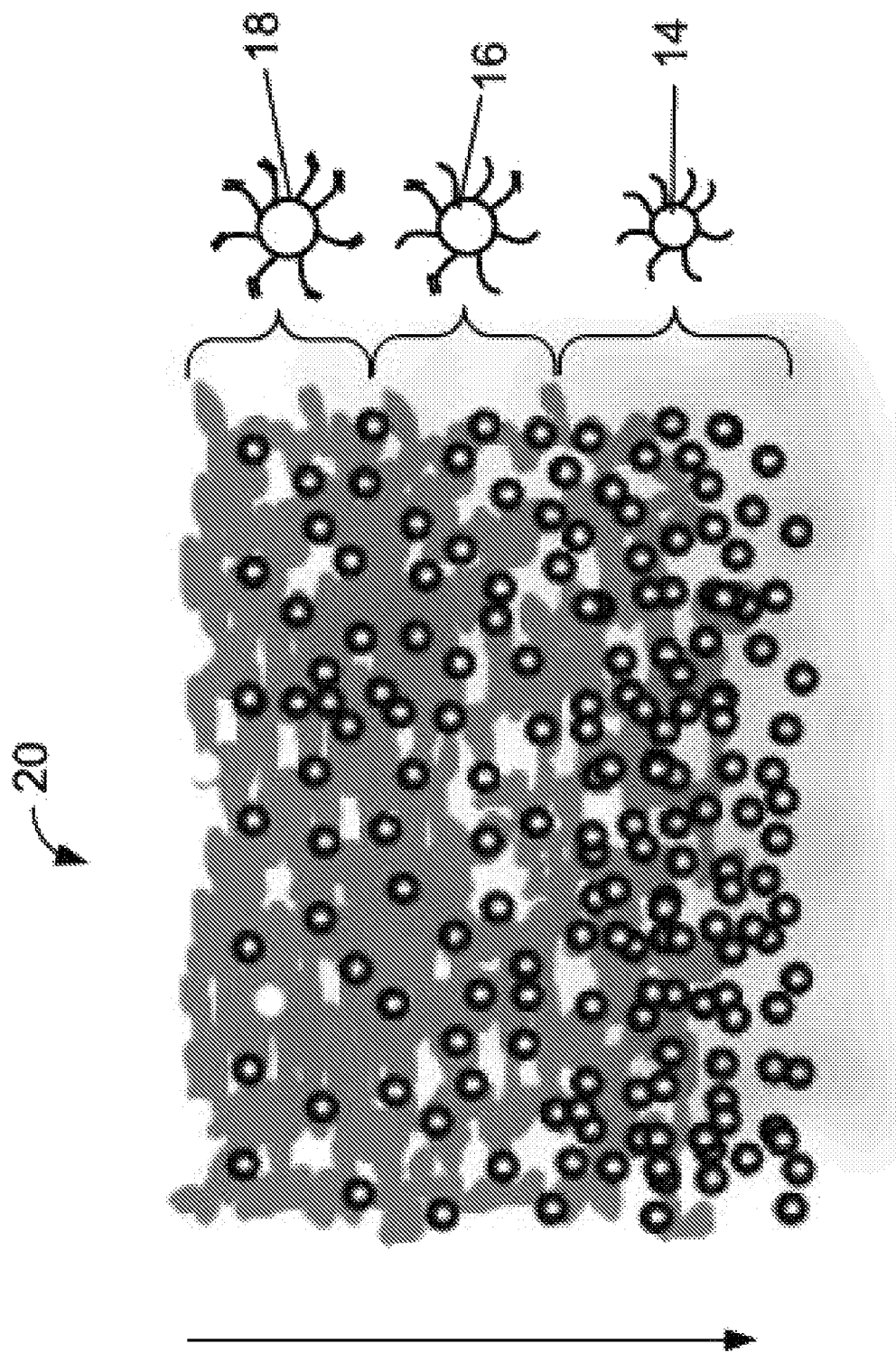

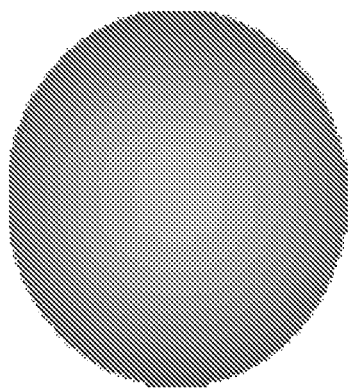
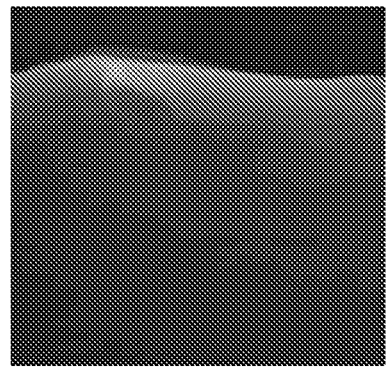
Fig. 7A    Fig. 7B
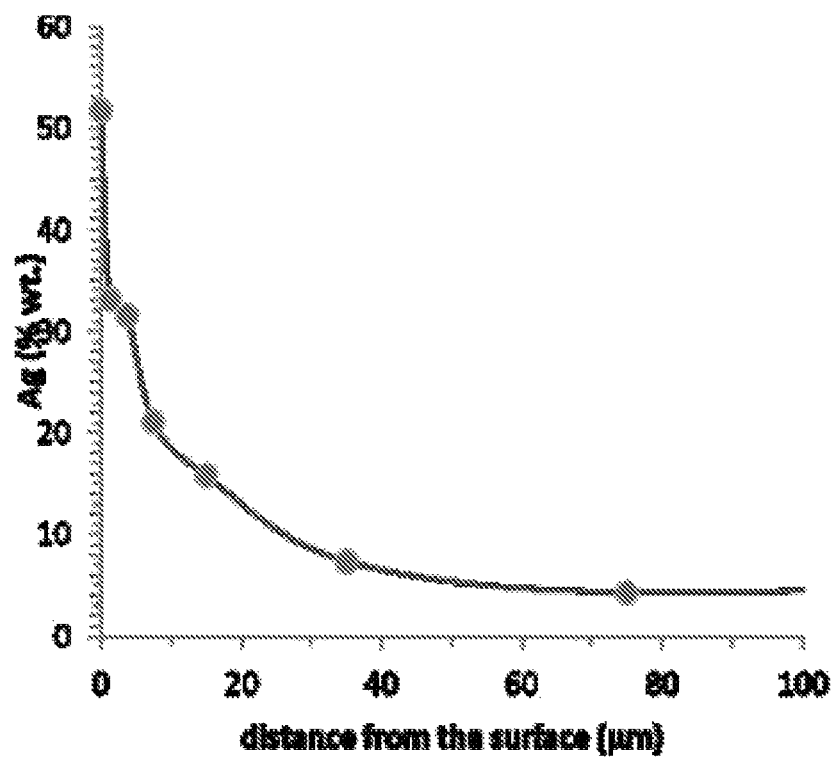
Fig. 7C

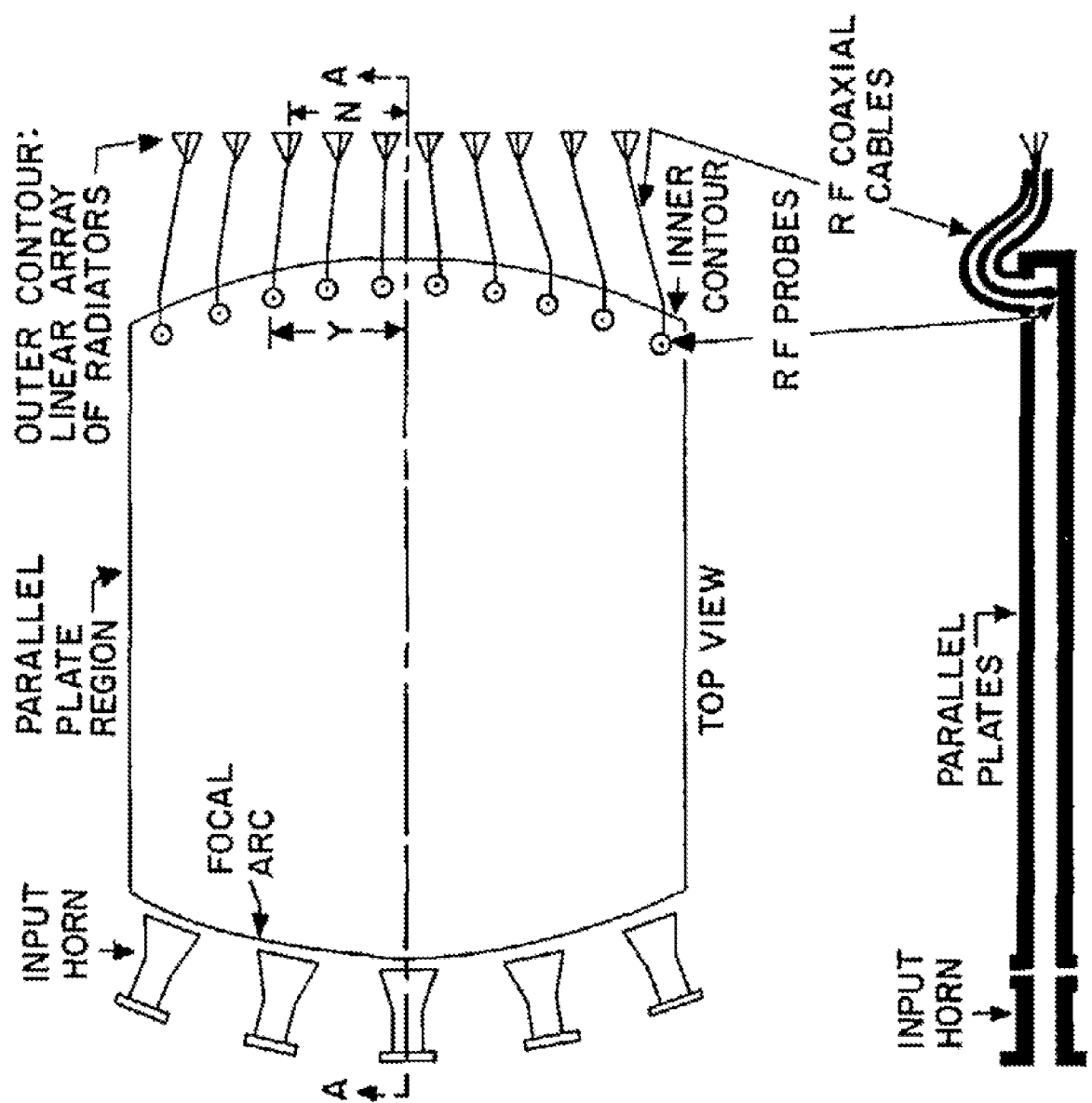

3D PRINTED GRADED REFRACTIVE INDEX DEVICE

CROSS-REFERENCE TO RELATED APPLICATIONS

This application claims the benefit of, and priority from, the following applications, all of which applications are incorporated herein by reference in their entirety: U.S. Provisional Patent Application No. 62/895,218, filed on Sep. 3, 2019; U.S. Provisional Patent Application No. 62/923,136, filed on Oct. 18, 2019; U.S. Provisional Patent Application No. 62/923,103, filed on Oct. 18, 2019; U.S. Provisional Patent Application No. 62/923,043, filed on Oct. 18, 2019; and PCT Patent Application PCT/IB2019/058923, filed on Oct. 18, 2019.

FIELD

The disclosure relates to graded-index (GRIN) devices, such as graded-index lenses.

BACKGROUND

Traditional methods of manufacturing are onerous and unable to fabricate a true graded-index (GRIN) device. Current manufacturing techniques do not allow for the precise 3D spatial distribution of electromagnetic properties. It is usually approximated by discretized or non-continuous steps, for example, implemented as onion-like concentric thin hemispherical layers, which are both difficult to build with adequate material property and geometry accuracy. The result is usually a stepped-graded lens rather than a truly graduated lens i.e. the result is a lens with discontinuous refractive index. Assembly of such a spherical lens is also challenging because care must be taken to avoid air gaps between different layers.

Due to these fabrication challenges 3D lenses, such as Luneburg lenses, only operate up to 10 GHz. Layering of the varying refractive index materials to fabricate such a lens yields less than an ideal step function in the refractive index. Often, a large number of radiation elements, power splitters, phase sifters, and control units are employed to make up for the deficiencies, resulting in a complex and costly system.

The background herein is included solely to explain the context of the disclosure. This is not to be taken as an admission that any of the material referred to was published, known, or part of the common general knowledge as of the priority date.

SUMMARY

In accordance with an aspect, there is provided a GRIN (graded-index) device comprising: i) a first phase comprising at least one polymer; ii) a second phase comprising at least one first component; and, optionally, iii) an interface between the first phase and the second phase, wherein the interface has a concentration gradient of the at least one first component, whereby the concentration of the at least one first component decreases with distance away from the second phase towards the first phase, wherein the at least one first component comprises at least one functional component, at least one functional precursor component, or combinations thereof, and wherein the GRIN device is a functional GRIN device, a functional precursor GRIN device, or a combination of a functional and functional precursor GRIN device.

In accordance with another aspect, there is provided a formulation for making a graded index device, the formulation being capable of making a graded index device having a low dielectric loss, a high gain, tunable permittivities, permeability, and/or continuous variations of refractive index along a macroscopic path of the graded index device.

In accordance with another aspect, there is provided a formulation for making an GRIN device, the formulation comprising a composition having at least one first component and at least one polymerizable component, the at least one polymerizable component is polymerizable to form at least one polymer, wherein at least two phases are formed from the at least one first component and the at least one polymer, wherein the at least one first component comprises at least one functional component, at least one functional precursor component, or combinations thereof, wherein the GRIN device is a functional GRIN device, a functional precursor GRIN device, or a combination of a functional and functional precursor GRIN device.

In accordance with another aspect, there is provided a method for making a GRIN device, the method comprising: a) combining at least one first component and at least one polymerizable component to form a formulation; and b) polymerizing the at least one polymerizable component to form at least one polymer, wherein at least two phases are formed from the at least one first component and the at least one polymer, wherein the at least one first component comprises at least one functional component, at least one functional precursor component, or combinations thereof, and wherein the GRIN device is a functional GRIN device, a functional precursor GRIN device, or a combination of a functional and functional precursor GRIN device.

It is understood that one or more of the aspects described herein (and above) may be combined in any suitable manner. The novel features of the present invention will become apparent to those of skill in the art upon examination of the following detailed description of the invention. It should be understood, however, that the detailed description of the invention and the specific examples presented, while indicating certain aspects of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The present invention will be further understood from the following description with reference to the Figures, in which:

FIG. 5B shows a cross-sectional view of an exemplary graded refractive index lens structure fabricated from the composite of FIG. 3.

FIG. 7A shows a schematic of the cross-section of cylinder illustrating a concentration gradient in silver.

FIG. 7B shows an electron microscope image in backscattered mode for the cylinder of FIG. 7A.

FIG. 7C shows an EDS analysis of the composition of the cross-section of the cylinder of FIG. 7A.

FIG. 17 shows an example Rotman lens.

DETAILED DESCRIPTION OF CERTAIN ASPECTS

Definitions

Figure 1:
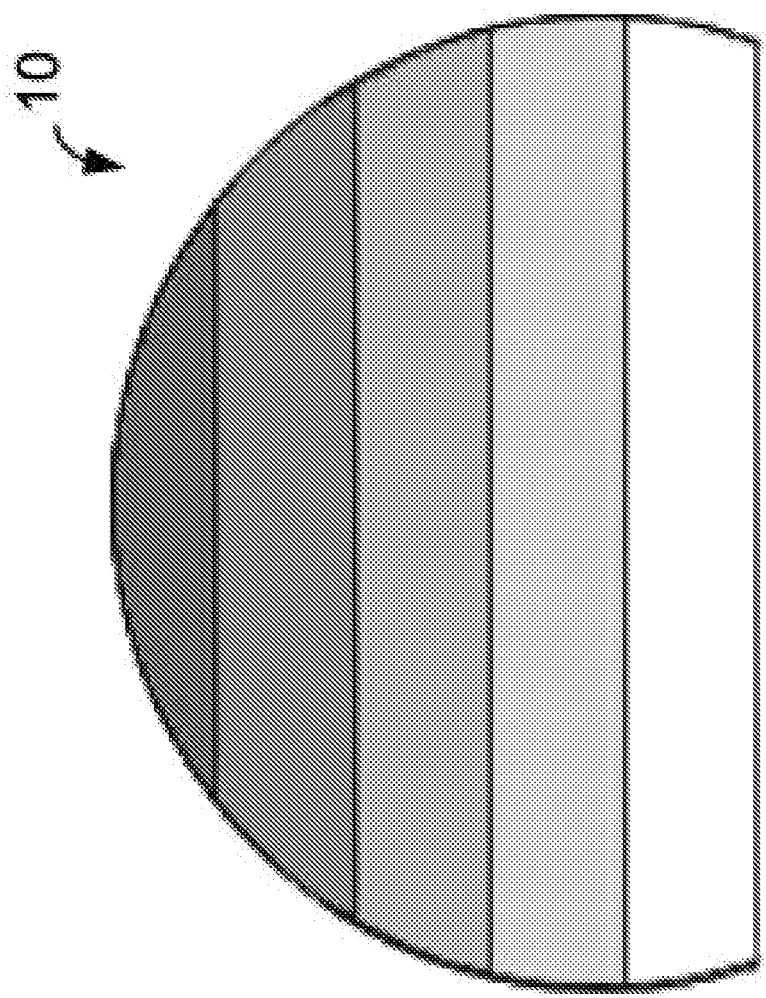
FIG. 1 shows a cross-sectional view of a prior art traditional stepped refractive lens.

Unless otherwise explained, all technical and scientific terms used herein have the same meaning as commonly understood by one of ordinary skill in the art to which this disclosure belongs. Although any methods and materials similar or equivalent to those described herein can be used in the practice for testing of the present invention, the typical materials and methods are described herein. In describing and claiming the present invention, the following terminology will be used.

It is also to be understood that the terminology used herein is for the purpose of describing particular aspects only and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like. Typically, a composition consisting essentially of a set of components will comprise less than 5% by weight, typically less than 3% by weight, more typically less than 1%, and even more typically less than 0.1% by weight of non-specified component(s).

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

The phrase "at least one of" is understood to be one or more. The phrase "at least one of . . . and . . . " is understood to mean at least one of the elements listed or a combination thereof, if not explicitly listed. For example, "at least one of A, B, and C" is understood to mean A alone or B alone or C alone or a combination of A and B or a combination of A and C or a combination of B and C or a combination of A, B, and C. "At least one of at least one of A, at least one of B, and at least one of C" is understood to mean at least one of A alone or at least one of B alone or at least one of C alone or a combination of at least one of A and at least one of B or a combination of at least one of A and at least one of C or a combination of at least one of B and at least one of C or a combination of at least one of A, at least one of B, and at least one of C.

The term "composition" or "formulation" may be used interchangeably and is understood to mean having two or more components/elements.

The term "a substantially homogeneous mixture" is understood to mean a substantially uniform mixture or combination of components.

The term "morphology" is understood to mean a shape and size of an area or a volume (e.g. the texture or topography of a surface; the habit of a crystal; the distribution of phases in a material).

The term "phase" is interchangeably used herein with "morphology", "layer", "zone", and/or "structure". These terms are understood to mean a region of a functional GRIN device (e.g. lens) and/or a functional precursor GRIN device having an area or volume of material with relatively uniform chemical and/or physical properties. For example, one phase or region may have uniform chemical and/or physical properties and another phase or region may have different uniform chemical and/or physical properties. It is understood that a given phase or region having relatively uniform chemical and/or physical properties can, but does not necessarily require, homogeneity throughout the phase. An interface between phases may also constitute a distinct phase. For example, a phase may have a component present in amounts falling within a desired concentration range. Alternatively, there may be a variation in the degree of polymer cross-linking in a phase to provide a desired level of flexibility, rigidity or other property to a functional GRIN device. Phases may arise from printing using distinct formulations, in sequence, to produce distinct regions, or may arise out of polymerization processes designed to result in GRIN device component phase separation, or a concentration gradient. In this regard, phases may be characterized according to one or more chemical and/or physical properties having regard to one or more components in order to delineate between phases/regions of a functional GRIN device and/or a functional precursor GRIN device. A combination of one or more phases/regions may be considered a single concentration gradient. In the context of an intermediate or final GRIN device structure, there may be one or more phases.

The term "resin" is understood to be a solid or viscous material which provides a polymer after polymerization via, for example, curing.

The term "polymer" may include polymers of various compositions or structures, including homopolymers, copolymers, and the like.

The term "concentration gradient" is understood to be spatial positioning of one or more molecules/ions from a region having a higher concentration of the one or more molecules/ions to a region having a lower concentration of the one or more molecules/ions.

The term "functional GRIN device" is considered herein to be a GRIN device that performs at least one function. It may encompass a GRIN device that has, for example, one or more chemical, mechanical (including structural), magnetic, thermal, electrical, optical, electrochemical, protective, and catalytic properties. It could also, or instead, include a GRIN device that has an aesthetically pleasing property. Functional GRIN devices can include a functional material such as a functionally graded material (FGM), and more specifically, a functionally graded composite material (FGCM). FGMs may be applied in a variety of industries, including, for example, aerospace, automobile, biomedical, defence, electrical/electronic, energy, marine, mining, opto-electronics, thermoelectronics, dentistry, and sports. FGMs may be used under a variety of conditions, including extreme temperature and wear conditions.

The term "interface", "functional interface" or "functional precursor interface" refers to a region or surface of a functional and/or functional precursor GRIN device, which can include a surface of an intermediate GRIN device in or comes into contact with another region/phase/material. For example, the interface may be a functional and/or functional precursor coating on the GRIN device (e.g. at an exterior surface) or as a layer/region within the GRIN device. The GRIN device may be an intermediate GRIN device, which is further processed (e.g. further layered/coated) such that the exterior surface now acts as an interface between the intermediate GRIN device and the additional layer/coating. In another example, the interface may be a graded functional and/or functional precursor material, the interface may be the region of the GRIN device where there is a certain concentration range of functional and/or functional precursor components to provide a function of the GRIN device. In a further example, the interface may be a functional and/or functional precursor composite material, the interface may be the region of the GRIN device where the composite provides a function of the GRIN device.

The term "particle" refers to a particle with any suitable size. In embodiments, the particle has an average particle size of about 10 nm to about 150 µm in diameter, for example, ranging from about 10 nm to about 100 µm; about 25 nm to about 100 µm; about 10 nm to about 50 µm; about 25 nm to about 50 µm; about 10 nm to about 25 µm; about 25 nm to about 25 µm; about 10 nm to about 10 µm; about 25 nm to about 10 µm; about 10 nm to about 5 µm; about 25 nm to about 5 µm; about 10 nm to about 2.5 µm; about 25 nm to about 2.5 µm; about 10 nm to about 500 nm; about 25 nm to about 500 nm; about 10 nm to about 250 nm; about 25 nm to about 250 nm; about 10 nm to about 100 nm; about 25 nm to about 100 nm; or about 50 nm to about 100 nm. The term "particle" as used herein thus includes "nanoparticle," which is considered herein to be a particle having a diameter less than about 1000 nm, and "microparticle," considered herein to be a particle having a diameter ranging from about 1 µm to about 1000 µm. In some embodiments, the particles described herein can be any shape, including generally spherical.

The term "coating" refers to a substantially homogenous layer (2D or 3D) or region within or on a GRIN device.

The term "functional coating" or "functional precursor coating" refers to a substantially homogenous layer (2D or 3D) or region of one or more functional and/or functional precursor components within or on a functional and/or functional precursor GRIN device. For example, the coating is a substantially homogenous layer (2D or 3D) of one or more functional and/or functional precursor components at or is an interface of the GRIN device. In another example, the coating of functional and/or functional precursor component(s) may be layered on a polymer (e.g. matrix or scaffold) but the coating (e.g. nanoparticles or a distinct polymer coating of functional and/or functional precursor components) itself is not per se distributed within (e.g. incorporated in) the polymer.

The term "graded" refers to the presence of a concentration gradient of one or more components. For example, a concentration gradient of one or more functional and/or functional precursor components, where the highest concentration of one or more of the functional and/or functional precursor components is at an interface of a GRIN device. In embodiments, the components of a concentration gradient are distributed within a polymer (e.g. matrix or scaffold) of the GRIN device and such non-homogenous graded functional and/or functional precursor material may exhibit changes in microstructures and/or composition through different regions of the GRIN device. The concentration gradient of a given component may change uniformly or change from shallow to steeper gradients (and vice-versa) through different regions of a GRIN device.

The term "composite" refers to a material made from two or more different components having different physical and/or chemical properties that, when combined, produce a material with characteristics different from the individual components themselves. The individual components remain as individual components within the GRIN device. For example, the functional and/or functional precursor GRIN devices may have regions (e.g. functional and/or functional precursor interface) or phases of one or more functional and/or functional precursor components that are not phase separated from a polymer (e.g. matrix or scaffold), and that are not distributed in a polymer as a concentration gradient. In another example, the functional and/or functional precursor GRIN devices may have regions (e.g. functional and/or functional precursor interface) or phases of one or more functional and/or functional precursor components at a functional interface that are not phase separated from a polymer (e.g. matrix or scaffold), and that are not distributed in a polymer as a concentration gradient. In certain embodiments, composite concentrations and distributions of functional and/or functional precursor components at a functional interface of a functional GRIN device are substantially the same as the starting composition of components prior to polymerization of a polymerizable component (e.g. resin) to form the polymer (e.g. matrix or scaffold) of the GRIN device.

The term "functional group" refers to a specific group of atoms that has its own characteristic properties, regardless of the other atoms present in a compound. Common examples are alkenes, alkynes, alcohols, amines, amides, carboxylic acids, ketones, esters, epoxides, and ethers.

As used herein, the term "dielectric constant" or "relative permittivity" are used interchangeably and refers to how easily a material can become polarized by imposition of an electric field on an insulator. Relative permittivity is the ratio of "the permittivity of a substance to the permittivity of space or vacuum". Relative permittivity can be expressed as $\varepsilon_r = \varepsilon/\varepsilon_0$, where $\varepsilon_r$=relative permittivity, $\varepsilon$=permittivity of substance, and $\varepsilon_0$=permittivity of vacuum or free space ($8.854187817 \times 10^{-12}$ F/m)

As used herein, the term "dielectric loss" refers to a dielectric material's inherent dissipation of electromagnetic energy (e.g. heat). It can be parameterized in terms of a dielectric loss tangent (tan $\delta$). The dielectric loss tangent (tan $\delta$) of a material denotes quantitatively dissipation of the electrical energy due to different physical processes such as electrical conduction, dielectric relaxation, dielectric resonance and loss from non-linear processes.

It is further to be understood that all molecular weight or molecular mass values, are approximate and are provided for description. Although methods and materials similar or equivalent to those described herein can be used in the practice or testing of this disclosure, suitable methods and materials are described below.

3D Printed GRIN Devices

Materials with gradients in their refractive index are the basis for a number of devices capable of manipulating the propagation of electromagnetic waves. The quality of these graded-index (GRIN) devices may depend, in part, on how the refractive index (n) varies spatially. In certain embodiments, small, continuous variations of refractive index along a macroscopic path is desired to irregular or stepped changes in refractive index, since small changes allow for smaller and more effective devices. The performance of GRIN devices may depend on the continuous change of the refractive index within the material. The changes in refractive index continuously reshape signals within the device, for example, to focus the signal or change the signal in other ways.

3D printed GRIN devices such as graded refractive index lenses or optical fibers may be used for several purposes. Such lenses may further focus antenna beam pattern by acting as an additional beam-forming layer. This feature may enable smaller arrays to have finer beam widths similar to those achieved with much larger arrays. Such lenses may re-shape the beam pattern of conformal antennas and arrays to any desired shape, with improved gain and beam width for radar applications. These lenses may provide multiplexing/demultiplexing of RF signals at much lower loss and form factor. These lenses may serve as a protective dome from the antenna or array. These lenses may also be designed as a parasitic element to improve the bandwidth of the antenna or array. These lenses may also serve as power splitters/combiners with asymmetric control made possible by multimoding a structure with dielectric gradient control. 3D printed lenses may embed ferroelectric materials due to its additive nature for adaptive electrical control of the lens for adapting the lens to environmental and operational conditions.

In other embodiments, these lenses may embed ferromagnetic materials for adaptive magnetic control of the lens to control beam focusing, for adapting against environmental and operational conditions. These lenses may embed integrated circuits, i.e. battery-less energy harvesters capable of actively modifying dielectric gradient. In this case, the harvester may receive energy via control radiative RF sources and serve as elements of periodic active "metamaterial" cells. These lenses may embed graphene periodic structures to exploit the "kinetic inductance" properties of graphene. The may allow for a miniaturization of the required periodic structures without any performance degradation.

Examples of lenses which may be fabricated in such a manner are a Luneburg lens, Eaton lens, and a Rotman lens. As one skilled in the art will understand, these are non-limiting examples, and other lenses may be fabricated in this manner, including various shapes/geometries.

A Luneburg lens is a spherically symmetric gradient-index lens. A typical Luneburg lens's refractive index n decreases radially from the center to the outer surface. They can be made for use with electromagnetic radiation from visible light to radio waves. In practice, Luneburg lenses are normally layered structures of discrete concentric shells, each of a different refractive index, such as the exemplary stepped lens 10 shown in FIG. 1. These shells form a stepped refractive index profile that differs slightly from Luneburg's solution.

An Eaton lens is a typical GRIN lens in which the refractive index varies from one to infinity. It has a singularity in that the refractive index goes to infinity at the center of the lens and it originates from a particular dielectric. The speed of light is reduced to zero at this point, and the lens can, therefore, change the wave trajectories any direction.

A Rotman lens is a type of beam-forming network. This lens allows multiple antenna beams to be formed without the need for switches or phase shifters. The lens may be thought of as a quasi-microstrip (or quasi-stripline) circuit where the beam ports are positioned such that constant phase shifts are achieved at the antenna ports. For certain index profiles, the lens will form perfect geometrical images of two given concentric spheres onto each other. There are an infinite number of refractive-index profiles that can produce this effect.

Figure 2:
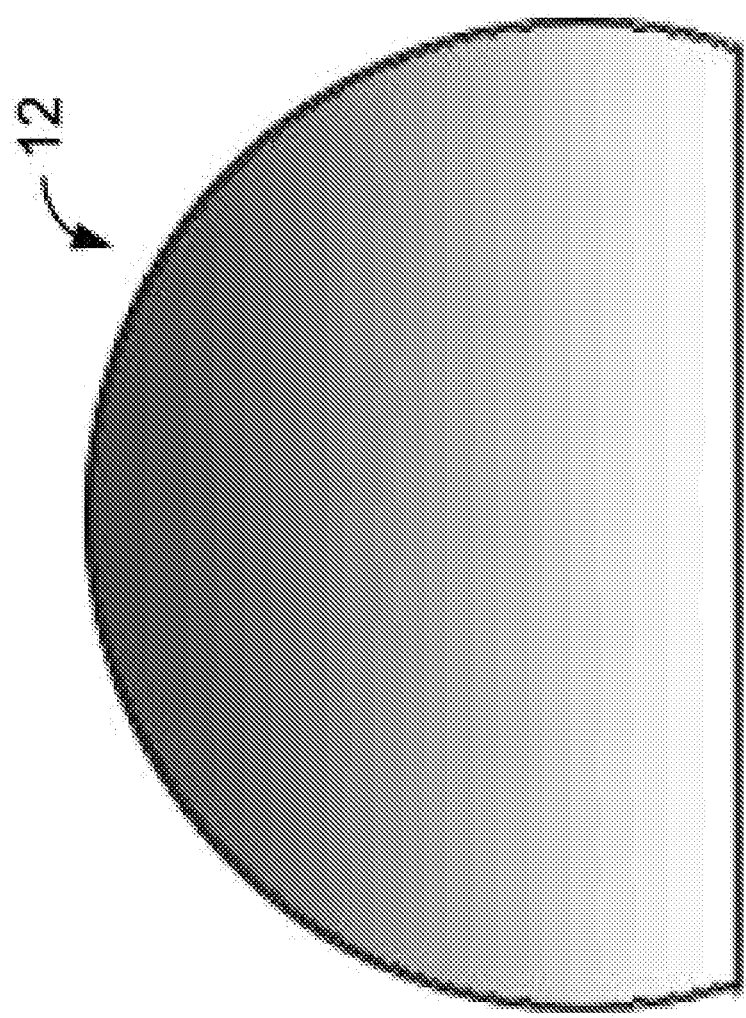
FIG. 2 shows a cross-sectional view of an exemplary graded refractive lens.

FIG. 2 shows a cross-sectional view of an exemplary graded refractive index lens 12. In this embodiment, the GRIN device may be 3D printed with a material such that the refractive index of the material is continuously changing as it has been printed to form a gradient of refractive index throughout the lens. Other properties that the material may have to be considered suitable are those materials having electromagnetic properties such as large range of permittivity, permeability and low dielectric loss, as well as being printable. For example, a material may have a high dielectric constant with a range of about 1 to about 5, a low dielectric loss tangent with a range of about 0.0001 to about 0.05, a gain with a range of about 0 to about 6 dB, a low dielectric loss with a range of about 0 to about 10%, and a permittivity with a range of about 1 to about 5

Formulations and Methods for Making GRIN Devices

These GRIN devices may be fabricated using several techniques:
  i. Using periodically assigned air cavities with arbitrary shapes and lattice to accurately control effective dielectric gradient.
  ii. Using periodically embedded metallic structures with arbitrary shapes and lattices to accurately control effective gradient (e.g. dielectric gradient). This technique will be extended to ferroelectric, ferromagnetic of graphene materials and other functional ceramic materials.
  iii. By controlling the depth and concentration that the metal is allowed to interact with the polymer and thus creating a lens with variable dielectric gradient.
  iv. By creating cavities to accommodate integrated IC harvesters via its additive process.

Continuous gradient refractive index devices may be made by formulating photoresins (e.g. formulations/compositions) with different refractive index, for example, fluorinated monomers, graded metallic/magnetic/ferromagnetic particles in graded-index dielectric, graded particle size of nanoparticles or porous graded dielectric materials. One approach may be to formulate a resin having solubilities and reaction rates which cause a gradient to form. Another approach may be by adding (e.g. metering in/pumping in) a second polymerizable components(s)/first components (e.g. monomer/functional material) slowly but continuously into, for example, a reservoir/vat as the structure is being printed. Examples of these approaches and others are described below.

A) Embodiments of the formulations and methods for making the GRIN device may include the following:
  1. A combination of at least one polymerizable component (e.g. monomer(s) and/or cross-linking agent(s)), photo-initiator and at least one first component (e.g. functional material(s)) that form a composition/formulation (e.g. a substantially homogeneous composition/formulation or a substantially homogeneous mixture) for use in, for example, vat polymerization 3D printing of the device.
  2. Upon polymerization of at least one polymerizable component, the at least one first component may diffuse away from the focused region of polymerization due to developing lower miscibility of the at least one first component in the region of polymerization to at least one first polymer. If the diffusion rate of the at least one first component is greater than the rate at which the at least one first polymer forms, the at least one first component may accumulate outside the polymerization region. The at least one first polymer forms without embedding substantial amounts of the at least one first component. If the diffusion rate of the at least one first component is lower than the rate at which the at least one first polymer forms, the at least one first component may become trapped within the at least one first component polymer.
  3. The rate at which the at least one first polymer forms may depend on one or more of: i) the extent of the at least one polymerizable component (e.g. monomer(s) and/or cross-linking agent(s)) conversion, in other words, the ratio of the at least one polymerizable component to the at least one first polymer ratio; ii) the concentration of cross-linking agent(s) in the at least one polymerizable component, iii) and the monomer(s) to cross-linking agent(s) ratio in the at least one polymerizable component.
  4. A combination of monomer, cross-linking agent, and initiator may be formulated (e.g. a substantially homogeneous composition/formulation or a substantially homogeneous mixture) such that the rate at which the at least one first polymer forms may gradually increase during polymerization (i.e. 3D printing). Accordingly, as the rate of polymerization (i.e. forming the at least one first polymer) increases with respect to the diffusion rate of the at least one first component, progressively more at least one first component becomes trapped in the at least one first polymer. A product (i.e. lens) with a concentration gradient of the first component(s) in the first polymer(s) results. The concentration gradient imparts a gradient of the refractive index of the product.

Figure 3:
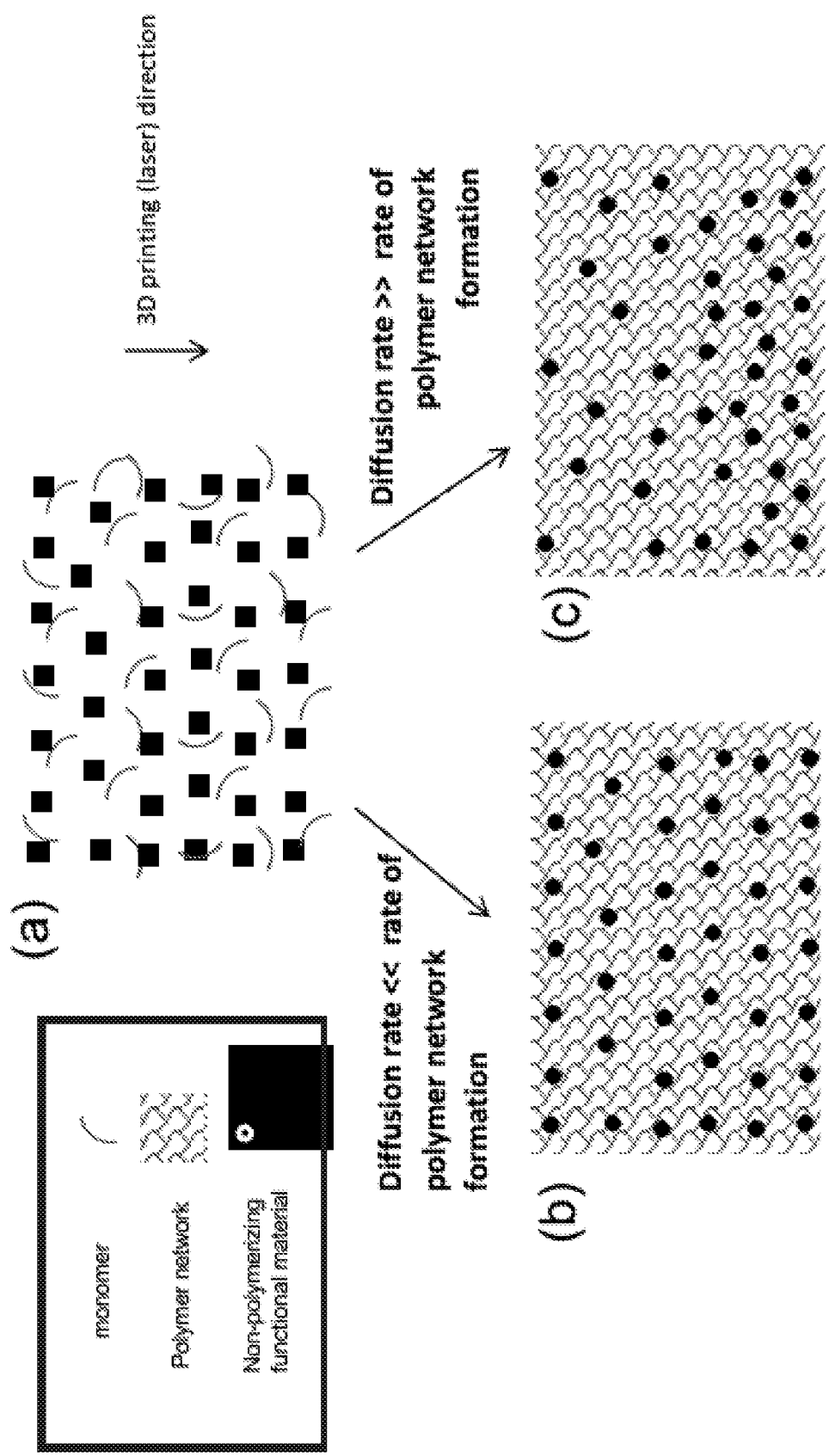
FIG. 3 shows an exemplary approach to 3D printing a graded-index device.

FIG. 3 shows an example of Approach A. In this example, in (a), a monomer (e.g. acrylate vs methacrylates, fluorinated vs PEG functionalized methacrylates, epoxies, vinyl ether, urethane acrylate, acrylamides, styrene), cross-linking agent (e.g. di, tri and tetra functional PEG functionalized acrylates or epoxies), photo-initiator and first component (e.g. ferroelectric, ferromagnetic, piezoelectric and carbon material graphene, CNT) form a composition (e.g. a substantially homogeneous mixture) for use in vat polymerization 3D printing. Upon polymerization of the monomer and cross-linking agent, the first component may diffuse away from the locus of polymerization due to decreasing miscibility between the first component and the polymerizing mixture. In (b), if the diffusion rate of the functional material is lower than the rate at which the polymer network forms, the first component becomes trapped within the polymer network. In (c), if the diffusion rate of the first component is greater than the rate at which a polymer network forms, the first component accumulates outside the polymerization front. The polymer network forms without embedding substantial amounts of the first component in its network. The rate at which the polymer network forms may depend on the extent of the monomer and cross-linking agent conversion (i.e. the monomer and crosslinker to polymer ratio), the concentration of cross-linking agent in the resin formulation and the monomer to crosslinking agent ratio. A homogeneous mixture of monomer, cross-linking agent, and initiator may be formulated such that the rate at which the polymer network forms may gradually increase during polymerization (i.e. 3D printing). As a result, as the rate of polymer network formation increases with respect to the diffusion rate of the first component, progressively more first component becomes trapped in the polymer structure. A GRIN device results with a concentration gradient of the first component. The concentration gradient imparts a gradient in the refractive index of the material.

In embodiments, the formulation comprises a composition (e.g. substantially homogeneous composition or substantially homogeneous mixture) having the at least one first component and the at least one polymerizable component. The at least one polymerizable component is polymerizable to form at least one polymer, wherein at least two phases are formed from the at least one first component and the at least one polymer. The at least one first component comprises at least one functional component, at least one functional precursor component, or combinations thereof. The GRIN device is a functional GRIN device, a functional precursor GRIN device, or a combination of a functional and functional precursor GRIN device. In an embodiment, the method comprises: a) combining at least one first component and at least one polymerizable component to form a composition and b) polymerizing the at least one polymerizable component to form at least one polymer, wherein at least two phases are formed from the at least one first component and the at least one polymer.

In an embodiment, the at least one first component comprises at least one functional component and the GRIN device is the functional GRIN device. In another embodiment, the at least one first component comprises at least one functional precursor component and the GRIN device is the functional precursor GRIN device. In a further embodiment, the at least one first component comprises at least one functional component and at least one functional precursor component and the GRIN device is the combination of the functional and functional precursor GRIN device.

The GRIN device formed from the formulation and method may comprise: i) a first phase comprising at least one polymer and ii) a second phase comprising at least one first component. It is understood that the first phase may further comprise other component(s) (e.g. same or different from the first component in the second phase). It is similarly understood that the second phase may further comprise other component(s) (e.g. same or different from the polymer in the first phase). With respect to these embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one region of the GRIN device to another region of the GRIN device, whereby the concentration of the first component increases from the first phase to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) the first and second phases form a gradient; 4) one phase comprises a composite and another phase comprises a composite (e.g. similar or different); or 5) one phase comprises a composite and another comprises a coating.

In other embodiments, a GRIN device formed from the formulation and method comprises: i) a first phase comprising at least one polymer; ii) a second phase comprising at least one first component; and iii) an interface between the first phase and the second phase. The interface has a concentration gradient of the at least one first component, whereby the concentration of the at least one first component decreases with distance away from the second phase towards the first phase. In additional embodiments, it is understood that the first phase may further comprise other component(s) (e.g. same or different from the first component in the second phase). It is similarly understood that the second phase may further comprise other component(s) (e.g. same or different from the polymer in the first phase). With respect to these embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one region of the GRIN device to another region of the GRIN device, whereby the concentration of the first component increases from the first phase, through the interface, to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) one phase comprises a composite and another comprises a composite (e.g. similar or different); or 4) one phase comprises a composite and another comprises a coating.

With respect to the above described embodiments, the formulation comprises a composition (e.g. substantially homogeneous composition or substantially homogeneous mixture) having the at least one first component and the at least one polymerizable component. The at least one polymerizable component is polymerizable to form at least one polymer, wherein at least two phases are formed from the at least one first component and the at least one polymer. The at least two phases comprise first and second phases. The first phase and second phases are a concentration gradient of the at least one polymer and the at least one first component. The first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. Accordingly, in an embodiment, the method comprises: a) combining the at least one first component and the at least one polymerizable component to form the composition and b) polymerizing the at least one polymerizable component to form the at least one polymer, wherein the at least two phases are formed from the at least one first component and the at least one polymer. The at least two phases comprise the first and second phases, wherein the first and second phases, together, form a concentration gradient of the at least one polymer and the at least one first component.

The formulation may comprise a composition (e.g. substantially homogeneous composition or substantially homogeneous mixture) having the at least one first component and the at least one polymerizable component. The at least one first component comprises first component (i) and first component (ii). The at least one polymerizable component is polymerizable to form at least one polymer, wherein at least two phases are formed from the at least one first component and the at least one polymer. The at least two phases comprise a first and second phase. The first phase and second phases are a concentration gradient of the at least one polymer and the first component (i) and first component (ii). Again, the first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. In certain embodiments, the first component (i) comprises ferroelectric, ferromagnetic, metal oxide nanoparticles, ceramic precursors, piezoelectric nanoparticles, quantum dots, or combinations thereof, and the first component (ii) comprises metal precursor(s). Accordingly, in an embodiment, the method comprises: a) combining the at least one first component and the at least one polymerizable component to form the composition and b) polymerizing the at least one polymerizable component to form the at least one polymer, wherein the at least two phases are formed from the at least one first component and the at least one polymer. The at least two phases comprise the first and second phase. The at least one first component comprises the first component (i) and the first component (ii). The at least two phases comprise the first and second phases, wherein the first and second phases, together, form a concentration gradient of the at least one polymer and the at least one first component.

The formulation may comprise a composition (e.g. substantially homogeneous composition or substantially homogeneous mixture) having the at least one first component and the at least one polymerizable component. The at least one first component comprises first component (i) and first component (ii). The at least one polymerizable component is polymerizable to form at least one polymer, wherein at least two phases are formed from the at least one first component and the at least one polymer. The at least two phases comprise a first and second phase. The first phase comprises the at least one polymer and the second phase comprises the first component (i) and first component (ii). For example, the first phase is a layer comprising the polymer and the second phase is a concentration gradient. With respect to the first phase, the first phase may be a concentration gradient and/or a composite. Again, the first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. In certain embodiments, the first component (i) comprises ferroelectric, ferromagnetic, metal oxide nanoparticles, ceramic precursors, piezoelectric nanoparticles, quantum dots, or combinations thereof, and the first component (ii) comprises metal precursor(s). Accordingly, in an embodiment, the method comprises: a) combining the at least one first component and the at least one polymerizable component to form the composition and b) polymerizing the at least one polymerizable component to form the at least one polymer, wherein the at least two phases are formed from the at least one first component and the at least one polymer. The at least one first component comprises the first component (i) and first component (ii). The at least two phases comprise the first and second phase. The first phase comprises the at least one polymer and the second phase comprises the first component (i) and first component (ii). For example, the first phase is a layer comprising the polymer and the second phase is a concentration gradient. With respect to the first phase, the first phase may be a concentration gradient and/or a composite.

In other embodiments, a GRIN device formed from the formulation comprises: i) a first phase comprising at least one polymer; ii) a second phase comprising at least one first component; and iii) an interface between the first phase and the second phase. The interface has a concentration gradient of the at least one first component, whereby the concentration of the at least one first component decreases with distance away from the second phase towards the first phase. The first phase comprises the at least one polymer and the second phase is a coating of the at least one first component. For example, the first phase may be a layer comprising the polymer and the second phase is a coating comprising the first component. The first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles.

In other embodiments, a GRIN device formed from the formulation comprises: i) a first phase comprising at least one polymer; ii) a second phase comprising at least one first component; and iii) an interface between the first phase and the second phase. The at least one first component comprises first component (i) and first component (ii) such that the second phase has first component (ii) and the interface has a concentration gradient of the first component (i) and the at least one polymer. The concentration of the first component (i) in the interface decreases with distance away from the second phase towards the first phase. The second phase is a coating. For example, the first phase is a layer comprising the polymer and the second phase is a coating comprising the first component. The first component(s) can be any of the examples outlined below with respect to the first component(s). In certain embodiments, the first component(s) may be ceramic precursors, metal precursors, ceramic precursors, piezoelectric materials, carbon nanotubes (CNT), graphene, metal alloy precursors, metalloid precursors, quantum dots, or combinations thereof. More specifically, the first component(s) may be ferroelectric, ferromagnetic, metal oxide nanoparticles, ceramic precursors, piezoelectric nanoparticles, carbon-based materials such as graphene, CNTs, BNNTs, quantum dots, or combinations thereof. The at least one first component may be a metal precursor, a ceramic precursor, ferroelectric, ferromagnetic, and/or metal oxide nanoparticles. In certain embodiments, the first component (i) comprises ferroelectric, ferromagnetic, metal oxide nanoparticles, ceramic precursors, piezoelectric nanoparticles, quantum dots, or combinations thereof, and the first component (ii) comprises metal precursor(s).

B) Other embodiments of the formulations and methods for making the GRIN device may include the following:
1. A combination of at least two polymerizable components (e.g. two or more monomer(s) and/or cross-linking agents) and photoinitiator that form a composition/formulation (e.g. a substantially homogeneous composition/formulation or a substantially homogeneous mixture) for use in, for example, vat polymerization 3D printing of the device. The refractive index of one of the polymerizable component(s) compared to the other, are substantially different (e.g. the two monomers, the two cross-linking agents, or the monomer and the cross-linking agent)
2. Upon photopolymerization of the at least two polymerizable components (e.g. 3D printing), for example, the monomer and cross-linking agent with a greater reactivity and polymerization rate are converted to polymers before those with a lower reactivity and polymerization rate.
3. The monomer and cross-linking agent with a higher reactivity rate are converted to at least one first polymer while the monomer and cross-linking agent with lower reactivity will diffuse away from the at least one first polymer region. As the photopolymerization continues, there may be progressively less of the higher reactivity monomer and cross-linking agent but more of the lower reactivity monomer and cross-linking agent available for polymerization. A polymer structure results with regions where photopolymerization was first initiated that are enriched with the at least one first polymer made from the faster reacting monomer/cross-linking agent while the regions where photopolymerization occurred later are enriched with at least one second polymer made from the lower reactivity monomer/cross-linking agent. In this manner, a 3D printed product with a concentration gradient of at least one first polymer and the at least one second polymer result.
4. The concentration gradient in the device imparts a gradient of the refractive index of the material.

Figure 4:
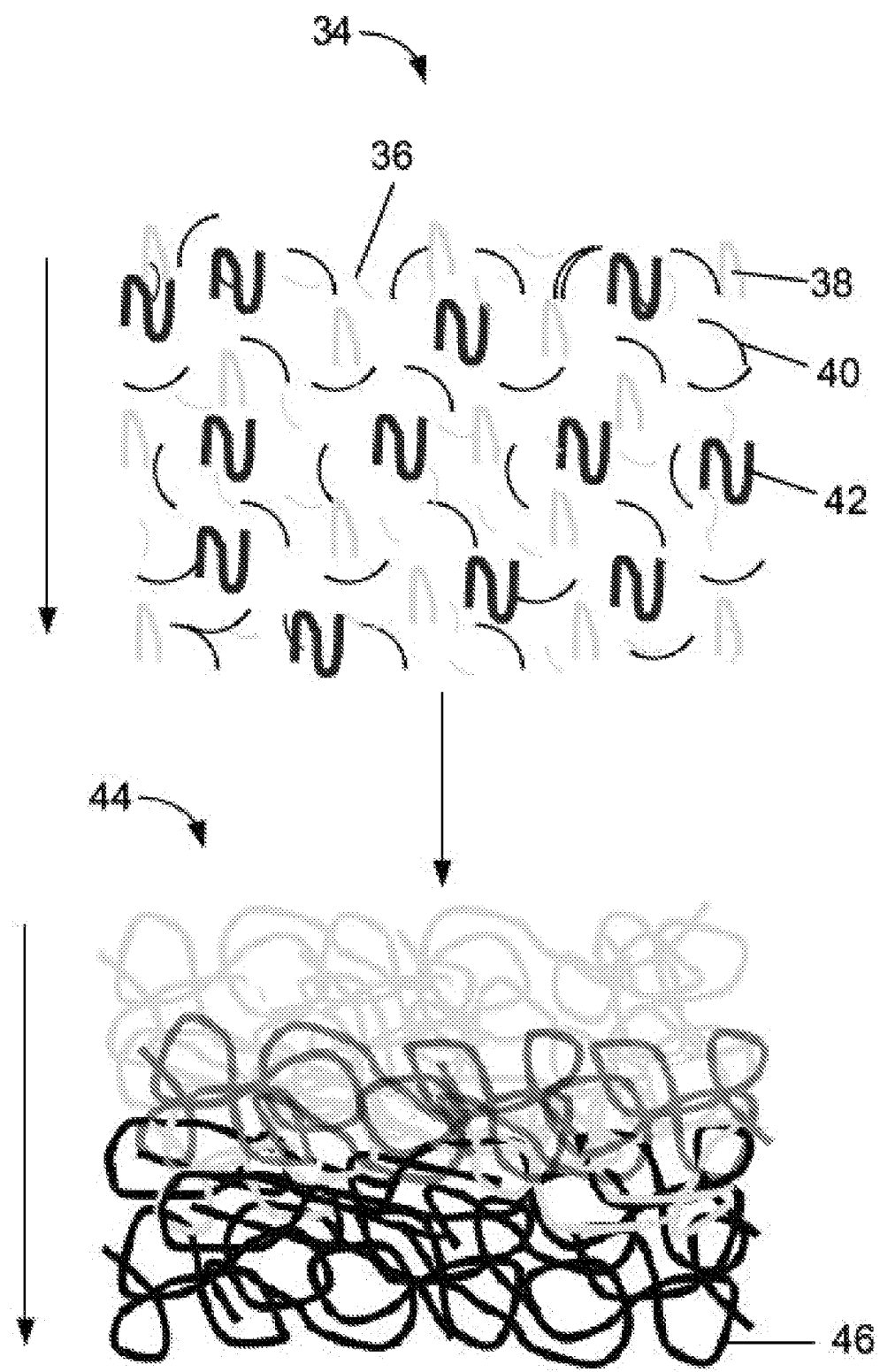
FIG. 4 shows an alternative approach to 3D printing a graded index device.

FIG. 4 shows an example of Approach B. An exemplary composition 34 of two or more monomers 36, 38, two or more cross-linking agents 40, 42, and photoinitiator is shown. The refractive index of the two monomers 36, 38 or the two cross-linking agents 40, 42 are substantially different. In this example, the monomers are a fast polymerizing monomer 36 and a slow polymerizing monomer 38, and the cross-linking agents are a fast polymerizing cross-linking agent 40 and a slow polymerizing cross-linking agent 42. Upon photopolymerization in the 3D printer, the fast polymerizing monomer 36 and fast polymerizing cross-linking agent 40 which have greater reactivity and polymerization rates are converted to polymers before the slow polymerizing monomer 38 and the slow polymerizing cross-linking agent 42, which have lower reactivity and polymerization rates.

The monomer 36 and cross-linking agent 40 with a higher reactivity rate are consumed (as polymers) first while the monomers 38 and cross-linking agent 42 with lower reactivity will accumulate outside the polymerization front. As the printing continues in time, the printed structure 44 has progressively less of the higher reactivity monomer 36 and cross-linking agent 40 but more of the lower reactivity monomer 38 and cross-linking agent 42 available for polymerization. The printed polymer structure 44 results with regions where photopolymerization was first initiated that are enriched with a polymer made from fast reacting monomer 36/cross-linking agent 40 while the regions where photopolymerization took place at a later time are enriched with polymer made from the lower reactivity monomer 38/cross-linking agent 42. In this manner, a 3D printed product 44 with a gradient in the polymer may result. The concentration gradient in the functional material imparts a gradient in the refractive index of the material.

In embodiments, the formulation comprises a composition having at least one first polymerizable component and at least one second polymerizable component. The at least one first polymerizable component is polymerizable to form at least one first polymer, wherein at least two phases are formed from the at least one first polymer and the at least one second polymerizable component. The at least two phases comprise first and second phases. The first phase and second phases are a concentration gradient of the at least one first polymer and the at least one second polymer. The GRIN device is a functional GRIN device, a functional precursor GRIN device, or a combination of a functional and functional precursor GRIN device. In another embodiment, the at least one second polymerizable component is polymerizable to form at least one second polymer. In embodiments, the method for making a GRIN device comprises a) combining at least one first polymerizable component and at least one second polymerizable component to form a composition; and b) polymerizing the at least one first polymerizable component to form at least one first polymer, wherein at least two phases are formed from the at least one first polymer and the at least one second polymerizable component, and wherein the GRIN device is a functional GRIN device, a functional precursor GRIN device, or a combination of a functional and functional precursor GRIN device. The method may further comprise c) polymerizing the at least one second polymerizable component to form at least one second polymer.

In other embodiments, the method described herein includes orthogonal polymerization, different rates of polymerization, and/or thermodynamic miscibility.

For example, with respect to orthogonal polymerization, each of the polymerization reactions proceed via different mechanisms. In a specific embodiment, a mechanism of a polymerization reaction of the at least one first polymerizable component is different from a mechanism of a polymerization reaction of the at least one second polymerizable component. Other embodiments may include as follows: a sequence of chemical reaction(s) of converting the at least one first polymerizable component (e.g. at least one first monomer and/or at least one first cross-linking agent) to the at least one first polymer, which differs from a sequence of chemical reaction(s) of converting the at least one second polymerizable component (e.g. at least one second monomer and/or at least one second cross-linking agent) to the at least one second polymer. The chemical reaction(s) may include, for example, radical polymerization (e.g. involves the transfer of a radical from an initiator or building block to another monomer/cross-linking agent), cationic polymerization (e.g. involves the transfer of charge from a cationic initiator or building block to another monomer/cross-linking agent), and thermal polymerization (e.g. involves the addition of two or more molecules to form a larger molecule and eventually a polymer).

With respect to the different rates of polymerization, each of the polymerization reactions may proceed via different rates. For example, the rate of polymerizing the at least one first polymerizable component to form at least one first polymer is faster or slower than the rate of polymerizing the at least one second polymerizable component to form at least one second polymer. With respect to the rates of polymerization and in view of the different mechanisms of polymerization, certain monomer(s) that undergo radical polymerization may form polymers at a faster rate than other monomer(s) that undergo cationic polymerization. For example, (meth)acrylate-based monomers via radical polymerization may form polymers at a faster rate than epoxides via cationic polymerization. Different polymerization rates can also occur within the same mechanism of polymerization (e.g. radical polymerization). For example, acrylates tend to be more reactive in a radical polymerization reaction compared to a radical polymerization reaction with (meth)acrylates. In other embodiments, polymerization rates can increase with increasing monomer functionality, for example, from mono- to di- to tri-functional groups. In certain embodiments, the order of polymerization rates from fastest to slowest is tri-functionalized acrylates>di-functionalized acrylates>mono-functionalized acrylates>(meth)acrylates>epoxides. The at least one first and the at least one second polymerizable components may be selected from monomer(s)/crosslinker(s) of these categories.

With respect to the thermodynamic miscibility, each of the polymerization reactions may affect the thermodynamic miscibility. For example, thermodynamic miscibility of the at least one first polymer is different from thermodynamic miscibility of the at least one second polymer. In another example, with respect to a combination of the at least one first polymerizable component and the at least one second polymerizable component, as the at least one first polymerizable component (e.g. a first monomer and/or a first cross-linking agent) polymerizes to form the at least one first polymer, the molecular weight increases causing the entropy of mixing to be reduced which decreases the miscibility of the at least one second polymerizable component (e.g. a second monomer and/or a second cross-linking agent) in the polymer/monomer mixture, which causes phase separation. In other examples, the degree of phase separation can depend on the solubility and balance of intermolecular forces between each component (each of the first and second monomer(s)/cross-linking agent(s)). Incompatible functional groups in the polymerizable components can affect thermodynamic miscibility, such as polar vs. non-polar, steric vs. non-steric, aliphatic vs. aromatic, aliphatic vs. inorganic, can, for example, influence the solubility and degree of phase separation.

These different mechanisms, rates of polymerization, and miscibilities are properties that can control the placement/positioning of component(s) and/or polymer(s) within a GRIN device.

With respect to a) in the method, the composition has at least one first polymerizable component and at least one second polymerizable component. In an embodiment, the composition is a substantially homogeneous composition. In a further embodiment, the substantially homogeneous composition is a substantially homogeneous mixture.

Polymerization may be achieved via initiation of polymerization in selected region(s) of the composition (e.g. mixture) having at least one polymerizable component and at least one second polymerizable component, whereby such polymerization can induce phase separation. In embodiments, polymerization occurs in the selected region(s) to form a first polymer(s) and the unselected region(s) has the second polymerizable component(s). There may be some first polymerizable component(s) in the unselected region(s). The at least one polymerizable component and at least one second polymerizable component may be contained in, for example, as reservoir prior to polymerization of the selected region(s).

In embodiments, the polymerizing in b) and/or c) may comprise photopolymerization (e.g. photoinduced polymerization). In another embodiment, the at least one first polymerizable component has at least one first monomer and/or at least one first cross-linking agent. In another embodiment, the at least one second polymerizable component has at least one second monomer and/or at least one second cross-linking agent. In embodiments, the composition further comprises at least one photoinitiator. Polymerization may also occur via free-radical polymerization without a photoinitiator.

C) Other embodiments of the formulations and methods for making the GRIN device may include the following:
1. Examples of at least one first component includes ceramic nanoparticles having a high permittivity and/or low dielectric loss tangent such as, but not limited to barium titanate, or lead zirconium titanate. Ceramic nanoparticles may be functionalized with various concentrations of a polymerizable group. The ceramic nanoparticles with polymerizable groups, for example, on their surface allow them to be incorporated into a polymer.

While portions of the instant description refer to ceramic nanoparticles, it is contemplated that in some embodiments other types or size ranges of ceramic particles may be used instead of or in addition to ceramic nanoparticles. Examples of such other types or size ranges of ceramic particles may include ceramic micro-particles, and the like.
2. Ceramic nanoparticles with a high concentration of polymerizable groups at their surface may be rapidly incorporated into a polymer while nanoparticles with low or no polymerizable groups may be incorporated less rapidly in the polymer.
3. A resin made up of at least one polymerizable component (e.g. monomer(s) and/or cross-linking agent(s)), photoinitiator and ceramic nanoparticles functionalized with polymerizable groups form a composition/formulation (e.g. a substantially homogeneous composition/formulation or a substantially homogeneous mixture) for use in, for example, vat polymerization 3D printing of the device. Upon photopolymerization, the ceramic nanoparticles with polymerizable groups react with the polymerizable component(s). Gradually as the ceramic nanoparticles polymerize with the polymerizable component(s) at a rate faster than the polymerization of the polymerizable component(s) (e.g. monomer and cross-linking agent) themselves, the concentration of ceramic nanoparticles in the resin will decrease. As polymerization/printing continues, the polymer formed from the polymerizable component(s) themselves will have progressively fewer ceramic nanoparticles. In this manner, a gradient in the composition of the 3D product is made.

Figure 5A:
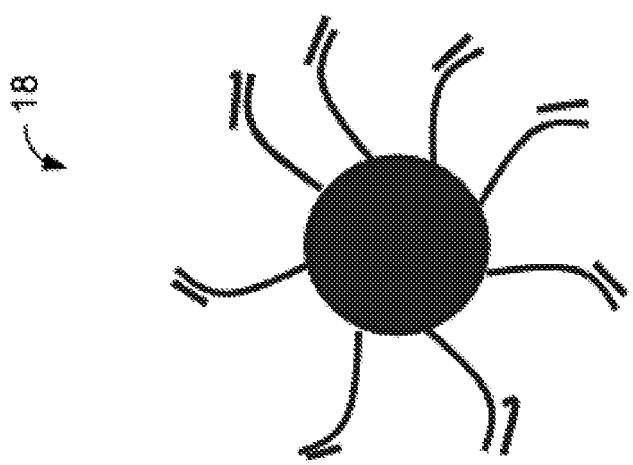
FIG. 5A shows an exemplary ceramic nanoparticle polymer composite with a gradient refractive index.
Figure 5A:
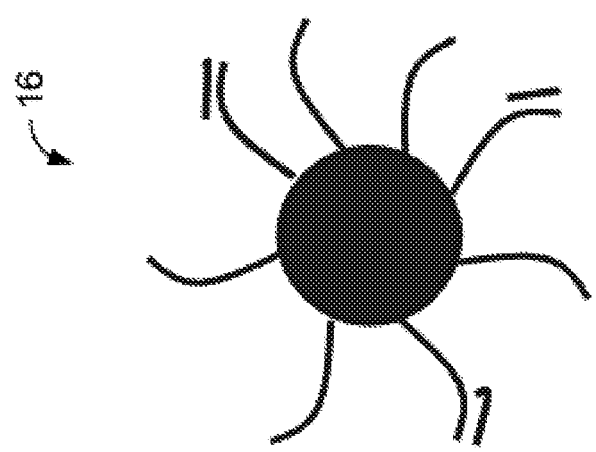
Figure 5A:
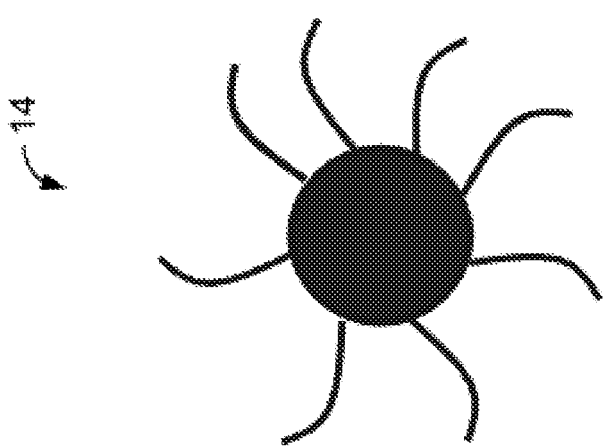

FIGS. 5A and 5B show an example of the ceramic nanoparticle having polymerizable groups and a polymer composition at various stages of a gradient. In FIG. 5A, a first particle 14 depicts ceramic nanoparticle(s) having polymerizable groups that are the last to react with polymerizable component(s) (e.g. monomer(s)). The second particle 16 depicts ceramic nanoparticle(s) having polymerizable groups that are second to react with polymerizable component(s). The third particle 18 depicts ceramic nanoparticle(s) having polymerizable groups that are first to react with polymerizable component(s). The ratio of the various ceramic nanoparticles vary to obtain a gradient, as shown in FIG. 5B. For instance, in the example particles of FIG. 5A, the third particle 18 with a larger number of the polymerizable groups would react first with the monomers; the second particle 16 with some polymerizable groups would react second with the monomers; and the first particle 14 with low number of polymerizable groups would react last, if at all, with the monomers. This rate of polymerization of each particle may result in a graded refractive index lens structure as shown in FIG. 5B with the gradient in ceramic nanoparticle decreasing in the device corresponding to polymerization of each of the particles. By controlling the rate of polymerization of the polymerizable component(s) (e.g. monomer(s)/cross-linking agent(s)), the changes in the refractive index of the material may be controlled. The material used may be, for example, a photoresin having high refractive index nanoparticles and a low refractive index monomer to provide a GRIN device, whereby the nanoparticles diffuse at different rates depending on the rate of polymerization of the monomer. In embodiments, the formulation comprises a composition having at least one first polymerizable component and at least one ceramic nanoparticle having at least one polymerizable group. The at least one polymerizable group is polymerizable with the at least one first polymerizable component to form at least one ceramic nanoparticle polymer and the at least one first polymerizable component is polymerizable to form at least one first polymer, wherein at least two phases are formed from the at least one ceramic nanoparticle polymer and at least one first polymer. The at least two phases comprise first and second phases. The first phase and second phases are a concentration gradient of the at least one ceramic nanoparticle polymer and at least one first polymer. The GRIN device is a functional GRIN device, a functional precursor GRIN device, or a combination of a functional and functional precursor GRIN device.

The polymerizable group can be any suitable polymerizable group. Examples include any of the polymerizable components listed herein (e.g. monomers and cross-linking agents).

Figure 11:
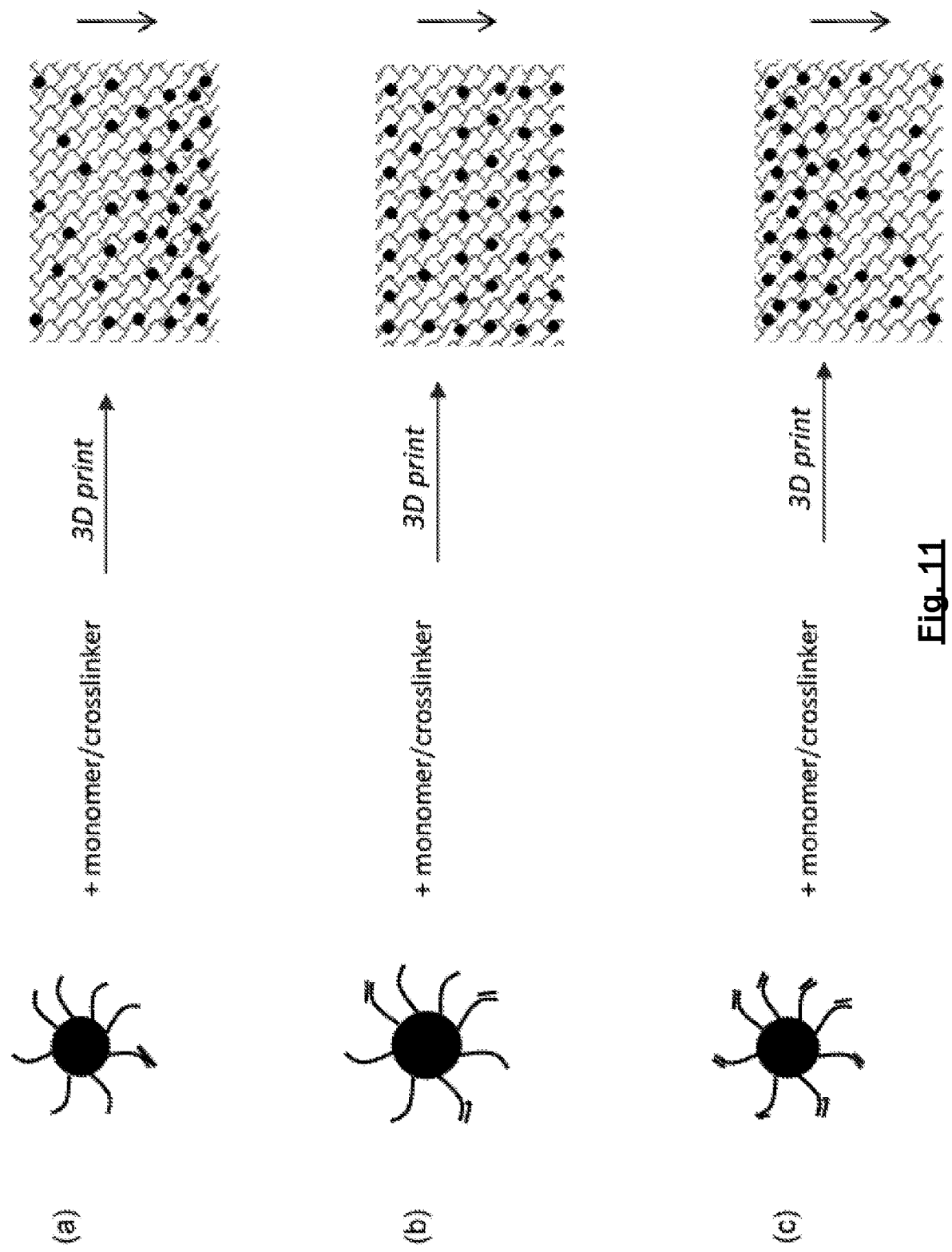
FIG. 11 shows an alternative approach to 3D printing a graded-index device.

FIG. 11 shows the particles 14, 16 and 18 functionalized with various concentrations of polymerizable groups are utilized. In (a), the nanoparticles are incorporated into a polymer network at a slow rate because of the lower surface concentration of polymerizable groups. In (b), the nanoparticles are incorporated into a polymer network at an intermediate rate because of the intermediate surface concentration of polymerizable groups. In (c), the nanoparticles are incorporated into a polymer network at a higher rate because of the higher concentration of surface polymerizable groups.

Figure 6:
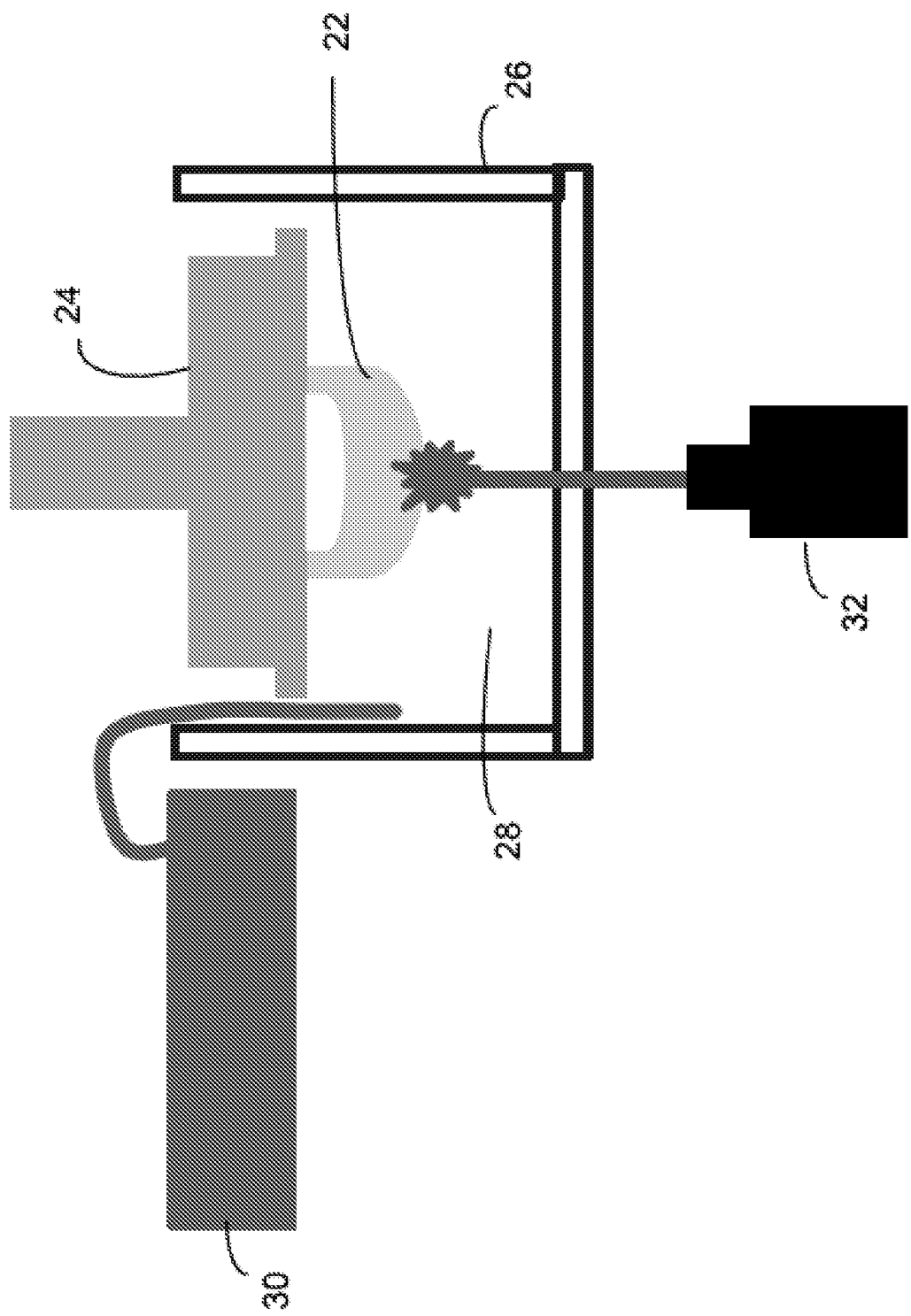
FIG. 6 shows an exemplary arrangement for fabricating a graded refractive index lens.

D) Other embodiments of the formulations and methods for making the GRIN device may include the following:

1. Another approach is shown in FIG. 6. A lens device 22 may be fabricated on a build plate 24, in a bath 26 of a first resin mixture 28, whereby a continuous feed of at least one first component 30 (e.g. non-polymerizing functional material (graphene, ferroelectric, piezoelectric, ceramic, metal oxide, conducting polymer, metal rod, metal nanoparticles, porogens, polymer foam, quantum dots, dyes, pigments, etc.) is fed into the bath 26. A reaction means 32, such as a laser continuously causes the reaction of 28 as the device 22 is being fabricated. The first resin mixture 28 and the first component 30 have different dielectric properties and refractive indices With respect to the many embodiments described above for A) to D), the formulation is capable of being sintered to form the GRIN device (e.g. lens), pyrolyzed to form the GRIN device, or sintered and pyrolyzed to form the GRIN device. In more specific embodiments, sintering is thermal sintering, UV-VIS radiation sintering, laser sintering or any combination thereof. In typical embodiments, minimum thermal sintering temperatures are selected based on a minimum temperature for converting the functional precursor to the functional GRIN device. Maximum thermal sintering temperatures may be selected based on a maximum temperature that the functional precursor and/or the functional GRIN device may be heated to without causing substantive decomposition or degradation. With respect to thermal sintering, the temperature ranges include, but are not limited thereto, from about 50° C. to about 300° C., or about 50° C. to about 280° C., or about 100° C. to about 280° C., or about 100° C. to about 270° C., or about 150° C. to about 280° C., or about 160° C. to about 270° C., or about 180° C. to about 250° C., or about 230° C. to about 250° C. Thermal sintering may occur under air or under inert condition(s), such as nitrogen. Thermal sintering may be performed for a time in ranges of about 15 minutes to about 180 minutes, or about 30 minutes to about 120 minutes, or about 45 minutes to about 60 minutes. In typical embodiments, sintering occurs under nitrogen with about 500 ppm oxygen. With respect to UV-VIS radiation sintering, sintering energies may range from about 1 J/cm$^2$ to about 30 J/cm$^2$, or about 2 J/cm$^2$ to about 10 J/cm$^2$, or about 2.5 J/cm$^2$ to about 5 J/cm$^2$, or about 2.4 J/cm$^2$ to about 3.1 J/cm$^2$. In certain embodiments, the pulse widths are about 500 μs to about 5000 μs, or about 1000 μs to about 4000 μs, or about 2500 μs to about 3000 μs. In typical embodiments, UV-VIS radiation sintering occurs under air. With respect to pyrolyzing, the temperature ranges include, but are not limited thereto, from about 350° C. to about 1200° C., or about 400° C. to about 900° C., or about 600° C. to about 800° C., or about 700° C. to about 800° C. Pyrolyzing may be performed for a time in a range of about 1 to about 60 minutes. Pyrolyzing may occur under air or under inert condition(s), such as nitrogen.

In another embodiment, the at least one functional precursor component is capable of being converted into at least one second functional component. In an embodiment, the at least one second functional component is different from said at least one functional component. In another embodiment, the at least one second functional component is the same as the at least one functional component. In embodiments, the at least one functional precursor component is capable of being converted into at least one second functional component via sintering and/or pyrolyzing, for example, as described above. In some embodiments, the at least one functional precursor component is capable of being converted into at least one second functional component via sintering. The sintering may be at least one of thermal sintering, UV-VIS radiation sintering, and laser sintering. In embodiments, sintering may occur during or after printing.

With respect to the at least one polymerizable component, polymerizing may be achieved by exposing the composition (e.g. substantially homogeneous composition or substantially homogeneous mixture) to a radiation and/or a heat source capable of initiating polymerization of the at least one polymerizable component. The radiation and/or heat source may be selected from a UV-Vis source, a laser, an electron beam, a gamma-radiation, an IR (heat) source, LED, microwave radiation, plasma and thermal treatment.

In embodiments, the polymerizing may comprise photopolymerization (e.g. photoinduced polymerization). In embodiments, the composition (e.g. substantially homogeneous composition or substantially homogeneous mixture) further comprises at least one photoinitiator. In another embodiment, the composition (e.g. substantially homogeneous composition or substantially homogeneous mixture) comprises at least one polymerizable component, which includes at least one cross-linking agent. This embodiment may also comprise a photoinitator. Polymerization may also occur via free-radical polymerization without a photoinitiator. The at least one polymerizable component may be polymerized via 3D printing. In an embodiment, the 3D printing uses photoactivation and may be selected from stereolithographic (SLA) printing or digital light processing (DLP). In embodiments, a coating of the at least one first component is formed during the printing stage.

In embodiments, the at least one first component phase can separate and migrate towards a region where the concentration of the at least one polymerizable component is greater forming a concentration gradient.

In embodiments, the GRIN device comprises at least about 0.1% by weight of the at least one first component, or at least about 1% by weight of the at least one first component, or at least about 3% by weight of the at least one first component, or at least about 5% by weight of the at least one first component, or at least about 7% by weight of the at least one first component, or at least about 10% by weight of the at least one first component, or at least about 15% by weight of the at least one first component, or at least about 20% by weight of the at least one first component, or at least about 25% by weight of the at least one first component, or at least about 30% by weight of the at least one first component, based on the total weight of the GRIN device. In typical embodiments, the GRIN device comprises about 0.1 wt % to about 30 wt % by weight of the at least one first component, or about 3 wt % to about 25 wt % by weight of the at least one first component, or about 5 wt % to about 20 wt % by weight of the at least one first component, or about 5 wt % to about 15 wt % by weight of the at least one first component, based on the total weight of the GRIN device. In typical embodiments, the GRIN device comprises a functional material. The functional material may be a functionally graded material (FGM). The FGM may be a functionally graded composite material (FGCM).

With respect to the amount of the at least one polymerizable component that may be used in embodiments, any suitable amount can be used. One embodiment includes from about 10% to about 99% by weight based on the weight of the composition. In some embodiments, the amount is from about 20% to about 99% by weight, from about 30% to about 99% by weight, from about 40% to about 99% by weight, from about 50% to about 99% by weight, from about 60% to about 99% by weight, from about 70% to about 99% by weight, or from about 80% to about 99% by weight based on the weight of the composition.

The GRIN device may be any suitable structure. The GRIN device may be a 3D- or 2D-GRIN device such as a lens. The GRIN device may have any desired geometry (e.g. shape). In embodiments, the GRIN device is conductive. The GRIN device may be selected to be any suitable conductivity. For example, it may have a conductivity (e.g. resistance) of at least about 1 $\Omega$/cm; at least about 2 $\Omega$/cm; at least about 5 $\Omega$/cm; at least about 10 $\Omega$/cm; at least about 15 $\Omega$/cm; or at least about 20 $\Omega$/cm. In other examples, the conductivity may be from about 1 to about 50 $\Omega$/cm; from about 2 to about 50 $\Omega$/cm; from about 5 to about 50 $\Omega$/cm; from about 10 to about 50 $\Omega$/cm; from about 15 to about 50 $\Omega$/cm; from about 20 to about 50 $\Omega$/cm; from about 1 to about 40 $\Omega$/cm; from about 2 to about 40 $\Omega$/cm; from about 5 to about 40 $\Omega$/cm; from about 10 to about 40 $\Omega$/cm; from about 15 to about 40 $\Omega$/cm; from about 20 to about 40 $\Omega$/cm; from about 1 to about 30 $\Omega$/cm; from about 2 to about 30 $\Omega$/cm; from about 5 to about 30 $\Omega$/cm; from about 10 to about 30 $\Omega$/cm; from about 15 to about 30 $\Omega$/cm; from about 20 to about 30 $\Omega$/cm; from about 1 to about 25 $\Omega$/cm; from about 2 to about 25 $\Omega$/cm; from about 5 to about 25 $\Omega$/cm; from about 10 to about 25 $\Omega$/cm; from about 15 to about 25 $\Omega$/cm; from about 20 to about 25 $\Omega$/cm; from about 10 to about 23 $\Omega$/cm; or about 18 to about 23 $\Omega$/cm.

In embodiments, the at least one polymer has a weight average molecular weight of about 10,000 to about 10,000,000, or about 10,000 to about 5,000 000, or about 10,000 to about 1,000,000, or about 50,000 to about 1,000,000, or about 50,000 to about 500,000. With respect to the at least one polymerizable component, it may comprise at least one monomer and/or at least one oligomer. In embodiments, the at least one polymerizable component comprises at least one monomer and/or at least one oligomer. The at least one polymerizable component may comprise at least one liquid monomer and/or at least one liquid oligomer. In a certain embodiment, the at least one polymerizable component comprises at least one resin. Some examples include resins based on epoxies, vinyl ethers, acrylates, urethane-acrylates, methacrylates, acrylamides, thiol-ene based resins, styrene, siloxanes, silicones, and any functionalized derivatives thereof (e.g. fluorinated methacrylates, PEG-functionalized methacrylates or epoxies). The at least one resin may comprise at least one commercial resin. In particular, typical examples of the at least one resin comprises at least one commercial resin for 3D printing such as, and without being limited thereto, 3D printing via photoactivation (e.g. stereolithographic (SLA) printing or digital light processing (DLP)). In further embodiments, the at least one resin may comprise at least one acrylate based-resin. The monomer resins may be elastomers or pre-ceramic polymers. Polymers with high permittivity and low dielectric loss tangent materials may include but are not limited to poly(vinylidine fluoride-trifluoroethylene, poly(vinylidine fluoride-chlorotrifluoroethylene poly(vinylidine fluoride-hexafluoropropylene and their copolymers with different mole ratios, epoxy based photoresins, polystyrene, parylene, polyimide, fluorinated polyimide, polyester acrylate, PEG acrylates, commercial SLA resins, polyarylene ether.

In embodiments, the monomers and oligomers are selected according to their physico-chemical and chemical properties, such as viscosity, surface tension, elasticity or hardness, number of polymerizable groups, and according to the printing method and the polymerization reaction type, e.g., the radiation source or heat source of choice. With respect to elasticity or hardness, some embodiments include modulus value ranges of from about 0.1 MPa to about 8000 MPa. In some embodiments, the monomers are selected from acid containing monomers, acrylic monomers, amine containing monomers, cross-linking acrylic monomers, dual reactive acrylic monomers, epoxides/anhydrides/imides, fluorescent acrylic monomers, fluorinated acrylic monomers, high or low refractive index monomers, hydroxy containing monomers, mono and difunctional glycol oligomeric monomers, styrenic monomers, vinyl and ethenyl monomers. In some embodiments, the monomers can polymerize to yield conductive polymers such as polypyrole and polyaniline. In some embodiments, the at least one monomer is selected from dipentaerythnitol hexaacrylate (DPHA) and trimethylolpropane triacrylate (TMPTA). In some embodiments, the at least one oligomer is selected from the group consisting of acrylates and vinyl containing molecules.

In other embodiments, the monomer can be any monomeric compound having a functional group, such as an activatable photopolymerizable group (photoinduced polymerization) that can propagate, for example, carbon-carbon, carbon-oxygen, carbon-nitrogen, or carbon-sulfur bond formation. In certain embodiments, the monomer is selected from mono-functional monomers (e.g. monomers with one functional group). During polymerization, the radical of the monofunctional monomer is formed and it will react with other monomers present to form oligomers and polymers. The resultant oligomers and polymers can have different properties depending on its structure. Some monomers may be selected depending on their flexibility, viscosity, curing rate, reactivity or toxicity. In one embodiment, the monomer is polymerized to form a polyacrylate such as polymethylmethacrylate, an unsaturated polyester, a saturated polyester, a polyolefin (polyethylenes, polypropylenes, polybutylenes, and the like), an alkyl resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybenzoxazoles, polybenzthiazoles, polyfluorocarbones, polyphenylene ethers, polyarylates, cyanate ester polymers, polystyrenes, polyacrylamide, polyvinylethers, copolymers of two or more thereof, and the like. In other embodiments, polyacrylates include polyisobomylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxylethylacrylate, poly-2-phenoxyethylmethacrylate, poly-2-ethylbutylmethacrylate, poly-9-anthracenylmethylmethacrylate, poly-4-chlorophenylacrylate, poly-cyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy)ethylester, and polyfurfurylmethacrylate, poly(ethylene glycol)methacrylate, polyacrylic acid and poly (propylene glycol)methacrylate.

Monomers and oligomers that may be used, for example, include acrylic monomers such as monoacrylics, diacrylics, triacrylics, tetraacrylics, pentacrylics, etc. Examples of other monomers include ethyleneglycol methyl ether acrylate, N,N-diisobutyl-acrylamide, N-vinyl-pyrrolidone, (meth) acryloyl morpholine, 7-amino-3,7-dimethyloctyl, (meth) acrylate, isobutoxymethyl(meth)acrylamide, isobornyloxyethyl (meth)acrylate, isobornyl (meth)acrylate, 2-ethylhexyl acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl(meth)acrylate, lauryl (meth)acrylate, dicyclopentadiene(meth)acrylate, dicyclopentenyloxyethyl (meth)acrylate, dicyclopentenyl (meth)acrylate, N,N-dimethyl(meth)acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl(meth)acrylate, 2-tribromophenoxyethyl (meth)acrylate, 2-hydroxyethyl (meth)acrylate, 2-hydroxypropyl (meth)acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth)acrylate, alkoxylated alkyl phenol acrylate, (poly)caprolactone acrylate ester from methylol-tetrahydrofuran, (poly)caprolactone acrylate ester from alkylol-dioxane, ethylene glycol phenyl ether acrylate, and methacryloxypropyl terminated polydimethylsiloxane.

With respect to the amount of the at least one monomer that may be used in embodiments, any suitable amount can be used depending on the desired functional and/or functional precursor GRIN device. One embodiment includes from about 1% to about 90% by weight of the at least one monomer based on the weight of the composition without the at least one first component. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the composition without the at least one first component.

With respect to the amount of the at least one monomer that may be used in embodiments based on the weight of the at least one polymerizable component itself, includes from about 1% to about 90% by weight of the at least one monomer. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the at least one polymerizable component.

In other embodiments, the at least one polymerizable component comprises or further comprises at least one ceramic precursor.

With respect to the at least one cross-linking agent, the at least one polymerizable component comprises at least one cross-linking agent or comprises at least one monomer/oligomer and at least one cross-linking agent. Cross-linking agents may have one or more functional groups and, typically, have two or more functional groups (e.g. di-, tri-, tetra-, etc. functional cross-linking agents). In certain embodiments, the functional groups may be present at both ends of the cross-linking agent, forming branched polymerization, whereby the cross-linking agent may react with two or more polymers. In certain embodiments, a 2D GRIN device is formed with a monofunctional cross-linking agent and a 3D GRIN device is formed with a multifunctional cross-linking agent.

In embodiments, the morphology of a functional and/or functional precursor GRIN device (e.g. 3D printed GRIN device) may depend on the concentration of cross-linking agent. The concentration of the cross-linking agent may control the rate at which a polymer network forms. In one embodiment, when the cross-linking agent concentration is high, the rate at which the monomers form polymer networks (e.g. branched polymerization) are high. High rates of polymer network formation may limit the diffusion of slower reacting or non-polymerizing components and provide more uniform compositions such as composites. Conversely, in other embodiments, when cross-linking agent concentrations are low and the rates of polymer network formations are low, slower polymerizing monomers or non-polymerizing components (e.g. silver salt, nanoparticles, etc.) can diffuse towards regions where their solubilities are higher. Their solubilities may be higher towards the surface of the printed GRIN device, where the polymer concentration is low and the monomer concentration is high. Therefore, formulations with low cross-linking agent concentrations may lead to printed GRIN devices (e.g. products) where the slower polymerizing monomer or non-polymerizing component forms a coating. In other embodiments, intermediate cross-linking agent concentrations can generate graded compositions in the GRIN devices. In embodiments, therefore, the morphology of the functional and/or functional precursor GRIN device can be a function of cross-linking agent concentrations in compositions (e.g. substantially homogeneous compositions or substantially homogeneous mixtures) containing non-polymerizing functional and/or functional precursor components.

In embodiments, the amount of functional and/or functional precursor component at the surface of the functional and/or functional precursor GRIN device decreases with increased concentration of cross-linking agent. The concentration of functional and/or functional precursor component at the surface can determine the resistance value of the printed GRIN device. As the concentration of cross-linking agent increases, the resistance of the functional and/or functional precursor component at the surface (e.g. coating) increases in view of the lower concentration of the functional and/or functional precursor component at the surface.

With respect to the amount of the at least one cross-linking agent that may be used in embodiments, any suitable amount can be used depending on the desired functional and/or functional precursor GRIN device. For example, the amount of the at least one cross-linking agent can be used to tune the morphology of the functional and/or functional precursor GRIN device. One embodiment includes from about 10% to about 99% mol based on the mol of the composition without the at least one first component (e.g. total mol of cross-linking agent+monomer). In some embodiments, the amount is from about 80% to about 99% mol, from about 85% to about 99% mol, from about 90% to about 99% mol, from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 50% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition without the at least one first component.

In some embodiments, the functional and/or functional precursor product is a composite. The amount of the at least one crosslinking agent used to make the product is from about 80% to about 99% mol, from about 85% to about 99% mol, or from about 90% to about 99% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor GRIN device is a graded and/or coated GRIN device. The amount of the at least one crosslinking agent used to make the GRIN device is from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 50% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor GRIN device is a graded GRIN device. The amount of the at least one crosslinking agent used to make the GRIN device is from about 35% to about 80% mol, from about 35% to about 75% mol, from about 35% to about 65% mol, from about 35% to about 55% mol, from about 35% to about 50% mol, from about 40% to about 80% mol, from about 45% to about 80% mol, from about 50% to about 80% mol, from about 55% to about 80% mol, from about 60% to about 80% mol, from about 65% to about 80% mol, or from about 70% to about 80% mol based on the mol of the composition. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent.

In some embodiments, the functional and/or functional precursor GRIN device is a coated GRIN device. The amount of the at least one crosslinking agent used to make the GRIN device is less than about 35% mol, less than about 30% mol, less than about 25% mol, less than about 20% mol, less than about 15% mol, less than about 10% mol, from about 1% to about 35% mol, from about 1% to about 30% mol, from about 1% to about 25% mol, or from about 1% to about 20% mol based on the mol of the composition. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

With respect to the amount of the at least one cross-linking agent, based on the weight of the composition, that may be used in embodiments, any suitable amount can be used. One embodiment includes from about 10% to about 99% by weight of the at least one cross-linking agent based on the weight of the composition. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the composition.

With respect to the amount of the at least one cross-linking agent, based on the weight of the composition without the at least one first component, that may be used in embodiments, any suitable amount can be used. One embodiment includes from about 10% to about 99% by weight of the at least one cross-linking agent based on the weight of the composition without the at least one first component. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the composition without the at least one first component.

In embodiments, the cross-linking agent is a radical reactive cross-linking agent. Examples of the radical reactive cross-linking agent include a methacrylic compound, an acrylic compound, a vinyl compound, and an allyl compound. Examples of suitable cross-linking agents which can be used to form polyacrylates include 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetra-ethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, and diacrylic urethane oligomers (reaction products of isocyanate terminate polyol and 2-hydroethylacrylate). Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di(trimethylolpropane) tetraacrylate, and ethoxylated pentaerythritol tetraacrylate. Examples of pentaacrylates include dipentaerythritol pentaacrylate and pentaacrylate ester. Other examples of cross-linking agents include: ethylene glycol di(meth)acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth)acrylate, EO modified trimethylolpropane tri(meth)acrylate, PO modified trimethylolpropane tri(meth)acrylate, tripropylene glycol di(meth)acrylate, neopentyl glycol di(meth)acrylate, both terminal (meth)acrylic acid adduct of bisphenol A diglycidyl ether, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa(meth)acrylate, dipentaerythritolpenta(meth)acrylate, dipentaerythritol tetra(meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, triethylene glycol dithiol, and combinations thereof.

With respect to the photoinitiators, in some embodiments, the radiation source employed for initiating the polymerization is selected based on the type of photoinitiator used. Generally, the photoinitiator is a chemical compound that decomposes into free radicals when exposed to light. There are a number of photoinitiators known in the art. For example, suitable photoinitiators include, but are not limited to, ethyl (2,4,6-trimethylbenzoyl)phenylphosphinate, 7-diethylamino-2-coumarin, acetophenone, p-tert-butyltrichloro acetophenone, chloro acetophenone, 2-2-diethoxy acetophenone, hydroxy acetophenone, 2,2-dimethoxy-2'-phenyl acetophenone, 2-amino acetophenone, dialkylamino acetophenone, benzyl, benzoin, benzoin methyl ether, benzoin ethyl ether, benzoin isopropyl ether, benzoin isobutyl ether, 1-hydroxycyclohexyl phenyl ketone, 2-hydroxy-2-methyl-1-phenyl-2-methylpropane-1-one, 1-(4-isopropylphenyl)-2-hydroxy-2-methylpropane-1-one, benzyl dimethyl ketal, benzophenone, benzoylbenzoic acid, methyl benzoyl benzoate, methyl-o-benzoyl benzoate, 4-phenyl benzophenone, hydroxy benzophenone, hydroxypropyl benzophenone, acrylic benzophenone, 4-4'-bis(dimethylamino)benzophenone, perfluoro benzophenone, thioxanthone, 2-chloro thioxanthone, 2-methyl thioxanthone, diethyl thioxanthone, dimethyl thioxanthone, 2-methyl anthraquinone, 2-ethyl anthraquinone, 2-tert-butyl anthraquinone, 1-chloro anthraquinone, 2-amyl anthraquinone, acetophenone dimethyl ketal, benzyl dimethyl ketal, α-acyl oxime ester, benzyl-(o-ethoxycarbonyl)-α-monoxime, diphenyl(2,4,6-trimethylbenzoyl)phosphine oxide, phenylbis(2,4,6-trimethylbenzoyl)phosphine oxide, bis(2,6-dimethoxybenzoyl)(2,4,4-trimethylpentyl)phosphine oxide, bis(4-methoxybenzoyl) diethylgermanium, tetrabenzoylgermane, tetramesitoylgermane, glyoxy ester, 3-keto coumarin, 2-ethyl anthraquinone, camphor quinone, tetramethylthiuram sulfide, azo bis isobutyl nitrile, benzoyl peroxide, dialkyl peroxide, tert-butyl peroxy pivalate, perfluoro tert-butyl peroxide, perfluoro benzoyl peroxide, etc. Further, it is possible to use these photoinitiator alone or in combination of two or more.

A skilled person would understand a suitable amount of photoinitiator(s) that may be used to initiate a photopolymerization reaction herein. One embodiment includes less than about 0.5% by weight of the at least one photoinitiator based on the weight of the composition. In some embodiments, the amount is less than about 0.4% by weight, less than about 0.3% by weight, less than about 0.1% by weight based on the weight of the composition.

With respect to the amount of the at least one photoinitiator that may be used in embodiments based on the weight of the at least one polymerizable component itself, includes less than about 2% by weight of the at least one photoinitiator. In some embodiments, the amount is less than about 1.8% by weight, less than about 1.5% by weight, less than about 1% by weight based on the weight of based on the weight of the at least one polymerizable component (e.g. resin).

It is understood that various ratios of the components may be used in the formulations. Depending on the ratios, different functional GRIN devices result. With respect to the ratios of the components of the at least one polymerizable component, any suitable ratios can be used depending on the desired functional and/or functional precursor GRIN device. With respect to the at least one polymerizable component comprising at least one monomer and at least one cross-linking agent, in embodiments, the ratio of the at least one monomer to at least one cross-linking agent includes about 9:1 to about 0:10 based on % by weight. In some embodiments, the amount is about 9:1 to about 1:9 based on % by weight, about 8:2 to about 2:8 based on % by weight, about 7:3 to about 3:7 based on % by weight, about 6:4 to about 4:6 based on % by weight, about 5:5 to about 5:5 based on % by weight, about 4:6 to about 6:4 based on % by weight, about 3:7 to about 7:3 based on % by weight, about 2:8 to about 8:2 based on % by weight, or about 1:10 to about 9:1 based on % by weight.

With respect to the at least one polymerizable component comprising at least one monomer, at least one cross-linking agent, and at least one photoinitiator, in embodiments, the ratio of the at least one monomer to at least one cross-linking agent to at least one photoinitiator includes about 8.9:1:0.1 to about 0:9.9:0.1 based on % by weight.

To design functional GRIN devices, and tune the chemical and/or physical properties, the attractive and repulsive forces (hydrophobic/hydrophilic interactions) between components may be leveraged to control the placement of functional components. When components have similar hydrophilic or hydrophobic properties, the components will have less of a driving force to phase separate upon polymerization. If the components differ in their hydrophobicity or hydrophilicity, the functional component will have a larger driving force to separate from the composition (e.g. polymerizing monomer/cross-linking agent mixture). The resulting GRIN device may be used as a scaffold for receiving metallic functional components (e.g. through electroplating) and as barrier type coatings (e.g. hydrophobic), dielectrics or insulating material, and may be selected for the desired flexibility and strength needed in the final GRIN device.

With respect to the at least one first component, in embodiments, are selected from suitable high dielectric and/or low dielectric loss tangent materials. With respect to the at least one first component, in embodiments, the at least one first component is substantially soluble in the at least one polymerizable component and is substantially insoluble when the at least one polymerizable component polymerizes. The at least one first component may be selected from the group consisting of metal precursors, ceramic precursors, piezoelectric materials, carbon nanotubes (CNT), graphene, metal alloy precursors, metalloid precursors, and combinations thereof. The first component(s) may be selected from ceramic(s). Exemplary ceramics include, but are not limited to, oxides, nitrides, and carbides of metals such as, barium titanate, strontium titanate, barium strontium titanate, bismuth strontium calcium copper oxide, copper oxide, boron oxide, boron nitride, ferrite, lead zirconate titanate, manganese oxide, magnesium diboride, silicon nitride, steatite, titanium oxide, titanium carbide, yttrium barium copper oxide, zinc oxide, zirconium dioxide, and partially stabilized zirconia. Ceramics may be oxides (alumina, beryllia, ceria, zirconia), nonoxides (carbide, boride, nitride, silicide) or composite materials. Examples include functional ceramics such as $BaTiO_3$ (BT), $Pb(Mg_{1/3}Nb_{2/3})O_3$ (PMN), $Pb(Zr_{0.52}Ti_{0.48})O_3$ (PZT), piezoelectric crystals (PMN-PT), Barium Strontium Titanate (BST), $BaTi_4O_9$—ZnO, $ZnFe_2O_4$, $ZnAl_2O_4$—$TiO_2$—, $Mg_2SiO_4$—, $Mg_4Ta_2O_9$— and $Al_2O_3$-based materials, $CaCu_3TiO_4O_{12}$, other metal oxides. Others include, for example, ferroelectric, ferromagnetic, and metal oxide nanoparticles, porous polymer interior, polymer foam, ceramic, piezoelectric nanoparticles, carbon based materials such as graphene, CNTs, BNNTs, metal oxides, quantum dots, conducting polymers etc.

In embodiments, the at least one first component is selected from the group consisting of metal salts, metal coordination compounds, organometallic compounds, organometalloid compounds, and combinations thereof. In typical embodiments, the at least one first component is selected from the group consisting of metal salts, metalloid salts, and combinations thereof. In certain embodiments, the at least one first component is selected from the group consisting of metal carboxylates, metalloid carboxylates, and combinations thereof. The metal carboxylates may comprise from 1 to 20 carbon atoms, from 6 to 15 carbon atoms, or from 8 to 12 carbon atoms. The carboxylate group of the metal carboxylates may be an alkanoate. Examples of the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof.

With respect to the metal precursors: the metal ion may be selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn+$, $Re^{7+}$, $Re^{6+}$, $Re^{5+}$, $Re^{4+}$, $Re^{3+}$, $Re^{2+}$, $Re+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh+$, $Ir^{6+}$, $Ir^{5+}$, $Ir^{3+}$, $Ir^{2+}$, $Ir^+$, $Ir$, $Ni^{3+}$, $Ni^{2+}$, $Ni^+$, $Ni$, $Pd^{6+}$, $Pd^{4+}$, $Pd^{2+}$, $Pd^+$, $Pd$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au+$, $Zn^{2+}$, $Zn+$, $Zn$, $Cd^{2+}$, $Cd+$, $Hg^{4+}$, $Hg^{2+}$, $Hg^+$, $B^{3+}$, $B^{2+}$, $B^+$, $Al^+$, $Al^{2+}$, $Al^+$, $Ga^{3+}$, $Ga^{2+}$, $Ga+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Ge$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$ and alloys of any of the foregoing.

The at least one first component used in the method may be selected amongst nanoparticles and/or microparticles of at least one first component described herein. In certain embodiments, the nanoparticles and/or microparticles may be metal precursors such as metal ions, metal salts, metal oxides, and/or metal complexes which may be convertible to metal. More broadly, the at least one first component may be any suitable inorganic particle that can separate into at least two phases from the at least one polymer, including nanoparticles and/or microparticles.

In some embodiments, the nanoparticles or microparticles are composed of a metal or combinations of metals selected from metals of Groups IIA, IIIA, IIIB, IVB, VB, VIB, VIIB, VIIIB, IB or IIB of block d of the Periodic Table of Elements. In other embodiments, said metallic nanoparticles or microparticles are selected from Ba, Al, Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Al, Sn, In, Ga, Ir, and combinations thereof. In some other embodiments, said metallic nanoparticles or microparticles are selected from Ba, Al, Cu, Ni, Ag, Au, Pt, Pd, Al, Fe, Co, Ti, Zn, In, Sn, Ga and combinations thereof. In yet other embodiments, said metallic nanoparticles or microparticles are selected from Al, Cu, Ni, Ti, Zn, Ag, and combinations thereof.

In some embodiments, said metallic nanoparticles or microparticles are selected from Ag, Cu, and Ag and Cu nanoparticles. In other embodiments, the metallic nanoparticles or microparticles are Ag nanoparticles. In some embodiments, the at least one one first component is a metal precursor selected to be convertible in-situ into a metal by a chemical or electrochemical process. The metal precursor may also be reduced into corresponding metal by reduction of the metal precursor in the presence of, for example, a suitable photoinitiator and a radiation source, a reducing agent (e.g. oxazolines such as 2-methyl-2-oxazoline, 2-ethyl-2-oxazoline, etc.), etc. Thus, in some embodiments, the metal precursor is selected to be convertible into any one of the metals recited hereinabove. In some embodiments, the metal precursor is a salt form of any one metal recited hereinabove.

In some embodiments, the metal salt is comprised of an inorganic or organic anion and an inorganic or organic cation. In some embodiments, the anion is inorganic. Non-limiting examples of inorganic anions include $HO^-$, $F^-$, $Cl^-$, $Br^-$, $I^-$, $NO_2^-$, $NO_3^-$, $ClO_4^-$, $SO_4^{2-}$, $SO_3^-$, $PO_4^-$ and $CO_3^{2-}$. In some embodiments, the anion is organic. Non-limiting examples of organic anions include acetate ($CH_3COO^-$), formate ($HCOO^-$), citrate ($C_3H_5O(COO)_3^{-3}$), acetylacetonate, lactate ($CH_3CH(OH)COO^-$), oxalate ($(COO)_2^{-2}$) and any derivative of the aforementioned. In some embodiments, the metal salt is not a metal oxide. In some embodiments, the metal salt is a metal oxide. In some embodiments, the metal salt is a salt of copper. Non-limiting examples of copper metal salts include copper formate, copper citrate, copper acetate, copper nitrate, copper acetylacetonate, copper perchlorate, copper chloride, copper sulfate, copper carbonate, copper hydroxide, copper sulfide or any other copper salt and the combinations thereof.

In some embodiments, the metal salt is a salt of nickel. Non-limiting examples of nickel metal salts include nickel formate, nickel citrate, nickel acetate, nickel nitrate, nickel acetylacetonate, nickel perchlorate, nickel chloride, nickel sulfate, nickel carbonate, nickel hydroxide or any other nickel salts and the combinations thereof.

In some embodiments, the metal salt is a salt of silver. Non-limiting examples of silver metal salts include silver carboxylates, silver lactate, silver nitrate, silver formate or any other silver salt and their mixtures. Typically, silver carboxylates may be used and comprise a silver ion and an organic group containing a carboxylate group. The carboxylate group may comprise from 1 to 20 carbon atoms, typically from 6 to 15 carbon atoms, more typically from 8 to 12 carbon atoms, for example 10 carbon atoms. The carboxylate group is typically an alkanoate. Some non-limiting examples of preferred silver carboxylates are silver ethylhexanoate, silver neodecanoate, silver benzoate, silver phenylacetate, silver isobutyrylacetate, silver benzoylacetate, silver oxalate, silver pivalate and any combinations thereof. In a typical embodiment, silver neodecanoate is used.

In other embodiments, the metal salt is selected from indium(III) acetate, indium(III) chloride, indium(III) nitrate; iron(II) chloride, iron(III) chloride, iron(II) acetate, gallium (III) acetylacetonate, gallium(II) chloride, gallium(III) chloride, gallium(III) nitrate; aluminum(III) chloride, aluminum (III) stearate; silver nitrate, silver chloride; dimethylzinc, diethylzinc, zinc chloride, tin(II) chloride, tin(IV) chloride, tin(II) acetylacetonate, tin(II) acetate; lead(II) acetate, lead (II) acetylacetonate, lead(II) chloride, lead(II) nitrate and PbS.

In other embodiments, the at least one first component is selected from metal oxides such as those mentioned above, including nanoparticles and/or microparticles. In certain embodiments, the metal oxides are selected from alumina, silica, barium titanate, transition metal oxides (e.g. zinc oxide, titanium oxide), and combinations thereof.

In other embodiments, the at least one first component is selected from nanowires, microparticles, nanoparticles, or combinations thereof, including any of the suitable at least one first component mentioned herein. In still other embodiments, the at least one first component comprises graphene.

With respect to the amount of the at least one first component, the amount of the at least one first component may be any suitable amount. For example, the amount may be from about 0.1% to about 90% by weight based on the weight of the composition. In some embodiments, the amount of the at least one first component in the composition may be from about 0.1% to about 80% by weight, from about 0.1% to about 70% by weight, from about 0.1% to about 60% by weight, from about 0.1% to about 50% by weight, from about 0.1% to about 40% by weight, from about 0.1% to about 30% by weight, or from about 0.1% to about 20% by weight based on the weight of the composition.

In other embodiments, various additives may be added. Additives can be included, for example, to increase the solubility of the at least one first component in the at least one polymer component. Various additives include, without being limited thereto, fillers, inhibitors, adhesion promoters, absorbers, dyes, pigments, anti-oxidants, carrier vehicles, heat stabilizers, flame retardants, thixotropic agents, flow control additives, dispersants, or combinations thereof. In typical embodiments, extending fillers, reinforcing fillers, dispersants, or combinations thereof are added. The additives can be microparticles or nanoparticles.

Examples of absorbers include 2-(2-hydroxyphenyl)-benzotriazole, 2-tert-Butyl-6-(5-chloro-2H-benzotriazol-2-yl)-4-methylphenol, 2-hydroxyphenyl benzophenone, 5-Chloro-2-hydroxybenzophenone, 2-(4,6-Diphenyl-1,3,5-triazin-2-yl)-5-[(hexyl)oxy]-phenol, 2,2'-(2,5-thiophendiyl)bis(5-tert-butylbenzoxazole), 4,4'-bis(2-benzoxazolyl)stilbene, 1,4-bis(5-phenyl-2-oxazolyl)benzene, 2-nitrophenyl phenyl sulfide, β-carotene, Sudan Orange G, avobenzone, cinoxate, homosalate, octocrylene, octyl salicylate, and phenylbenzimidazole sulfonic acid.

Examples of inhibitors include hydroquinone, monomethyl ether hydroquinone, tert-butyl hydroquinone, butylated hydroxytoluene, 4-tert-butyl catechol, pyrogallol, 2,3-dimethylhydroquinone, 2-methoxyhydroquinone, methylhydroquinone, cupferron, aluminum cupferrate, triphenylphosphite, triisodecyl phosphite, triallylphosphite, and vinylphosphonic acid.

In embodiments, the formulation may be used to make the GRIN device described herein.

In certain embodiments, the at least one polymer may be selected from acrylate, methacrylates, fluorinated methacrylates, PEG functionalized methacrylates, epoxies, vinyl ether, urethane acrylate, acrylamides, styrene, crosslinkers (di, tri and tetra functional PEG functionalized acrylates or epoxies) (e.g. 15-35% mol), and the at least one first component may be selected from ferroelectric, ferromagnetic, piezoelectric and carbon material graphene, and/or CNT, for use in vat polymerization 3D printing.

Without further description, it is believed that one of ordinary skill in the art can, using the preceding description and the following illustrative examples, make and utilize and practice the claimed GRIN devices, formulations and methods. A more complete understanding can be obtained by reference to the following specific examples. These examples are provided for purposes of illustration only, and are not intended to be limiting. Thus, the invention should in no way be construed as being limited to the following examples, but rather, should be construed to encompass any and all variations which become evident as a result of the teaching provided in the disclosure. The following working examples therefore, specifically point out aspects, and are not to be construed as limiting in any way.

EXAMPLES

Below is a list of abbreviations used to denote various chemical components of the formulations.

Abbreviations

| | |
|---|---|
| Ethylene glycol diacrylate | EGDA |
| 2-Ethylhexyl acrylate | EHA |
| Ethyl (2,4,6-trimethylbenzoyl) phenylphosphinate | TPO-L |
| Silver neodecanoate | AgND |
| 2-Ethyl-2-oxazoline | EtOxa |
| Polyethyleneglycol diacrylate Mn 250* | PEGDA250 |
| Tetraethyleneglycol diacrylate | TEGDA |
| Polyethyleneglycol diacrylate Mn 575* | PEGDA575 |
| Polyethyleneglycol diacrylate Mn 700* | PEGDA700 |
| 1,4-Butanediol diacrylate | BDDA |
| 1,6-Hexanediol diacrylate | HDDA |
| Ethylene glycol methyl ether acrylate | EGMEA |
| Di(trimethylolpropane) tetraacrylate | DTMPTA |
| 2-Methoxy (polyethyleneoxy)propyl trimethoxysilane | MPPTMS |
| Poly(3,4-ethylenedioxythiophene) polystyrene sulfonate | PEDOT:PSS |

*Mn is the number average molecular mass in g/mol

Printing, Sintering and Characterization for the Formulation Examples Outlined Below:

Ink Characterization:

TGA analysis of resin and functional material resins were performed via a TGA A588 TGA-IR module.

SLA printing of 3D GRIN devices: 3D GRIN devices using functional material (silver salt, silver and graphene) were printed using Peopoly Moai Laser SLA 3D Printer (Technical Specifications: Build Volume: 130×130×180 mm, Laser spot size: about 70 microns, Laser wave length: about 405 nm, Laser power: about 150 mW, Machine size: 330×340×660 mm, Layer Height: about 10 to about 200 microns, Z resolution: Layer Height: about 10 to about 200 μm). GRIN devices were printed using non-stick liner coated vat with laser power 58 and XY speed set 4.

Sintering of printed 3D GRIN devices: 3D GRIN devices were thermally sintered at about 200 to about 250° C. temperature (program) ranges by varying time using reflow oven under nitrogen with about 500 ppm oxygen. Intense pulsed light sintering (photonic curing) was also performed on thermally sintered samples with a Novacentrix Pulse-Forge® 1300 system with sintering energies ranging from about 2.4 to about 3.1 J/cm2 for about 3000 μs under ambient conditions.

Characterization of 3D GRIN devices: A two-point probe method was used to measure the resistance of the 3D printed GRIN devices using a multimeter after thermal and photonic sintering. Scanning electron microscopy (SEM) images were acquired with a Hitachi SU3500.

Formulation Examples 1 and 2

Examples 1 and 2 provide embodiments of formulations which resulted in formulations useful for making 3D printed GRIN devices.

Example 1

Gradients in the Refractive Index Formed Using Non-Polymerizing Functional Materials Made From Silver Neodecanoate (Non-Polymerizing Functional Group) and 65% PEGDA575/34% EHA Photoresin About 6.5 g of polyethyleneglycol diacrylate Mn 575, about 3.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen. The sample was sliced crosswise to image by SEM and perform EDS analysis across the sample.

FIG. 7A shows a schematic of the cross-section of a cylinder illustrating a concentration gradient of silver, with the concentration of silver at its highest at the outer surface and decreasing as a function of the distance from the surface of the cylinder. FIG. 7B shows an electron microscope image in backscattered mode showing the cylinder with a high concentration of silver (lighter area) near the surface and with a lower concentration of silver in its interior (dark area). FIG. 7C shows an EDS (Energy-dispersive X-ray spectroscopy) analysis of the composition of the cross-section of the cylinder. The concentration of silver is high at the surface of the cylinder and progressively decreases as a function of distance away from the surface of the cylinder. FIGS. 7A-7C show the capability to form gradient structures. Tuning the silver composition forms a gradient in the refractive index of the material.

Example 2

Gradients in the Refractive Index Formed Using Non-Polymerizing ZnO Nanoparticles and 50% PEGDA250 and 49% EHA About 5.0 g of polyethyleneglycol diacrylate Mn 250, about 4.9 g of 2-ethylhexylacrylate and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. To this vial, about 0.25 g of ZnO functionalized with 2-methoxy (polyethyleneoxy) propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 8A:
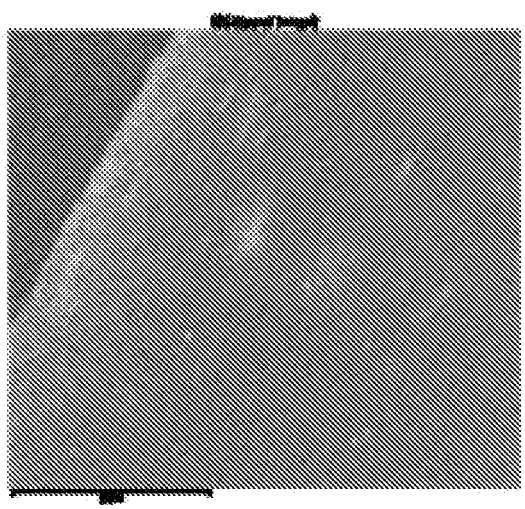
FIG. 8A shows an SEM image of the edge of the cross-section of a cylinder containing ZnO nanoparticles.
Figure 8B:
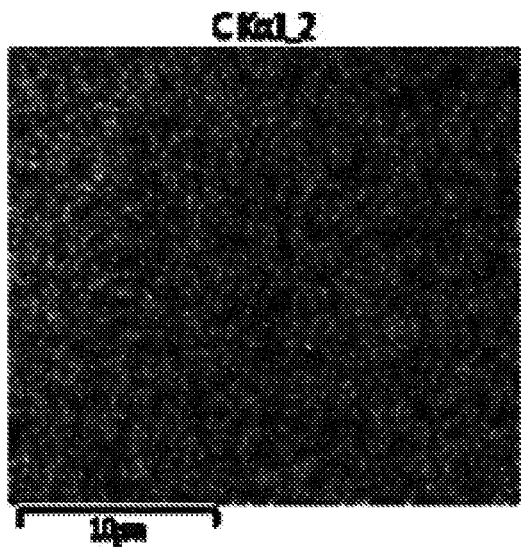
FIG. 8B shows an SEM image for carbon signal from EDS analysis of the cross-section of the cylinder in the same area as the SEM image of FIG. 8A.
Figure 8C:
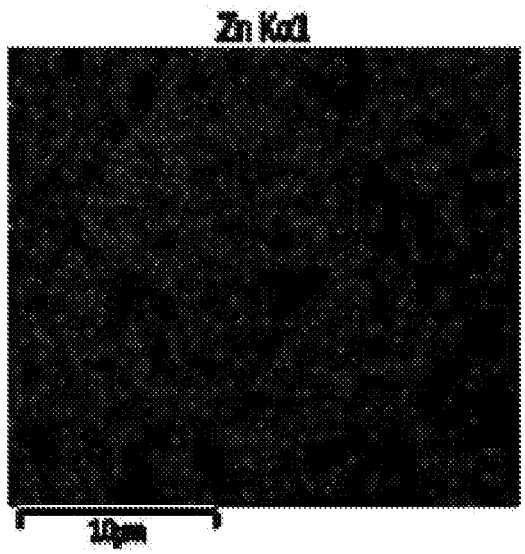
FIG. 8C shows the zinc signal from EDS analysis of the cross-section of the cylinder in the same area as the SEM image of FIG. 8A.

FIG. 8A shows an SEM image of the edge of the cross-section of a cylinder containing ZnO nanoparticles. FIG. 8B shows the SEM for carbon signal from EDS analysis of the cross-section of the cylinder in the same area as the SEM image of FIG. 8A and FIG. 8C shows the zinc signal from EDS analysis of the cross-section of the cylinder in the same area as the SEM image. The concentration of zinc decreases with increasing distance from the edge of the cylinder.

Formulation Examples 16-49

Examples 16-49 provide embodiments of formulations and printing conditions which resulted in formulations that may be useful for making 3D printed GRIN devices.

Example 16

Ag Precursor+(15% EGDA, 84% EHA) Resin

About 1.5 g of ethyleneglycol diacrylate, about 8.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 17

Ag Precursor+(20% EGDA, 79% EHA) Resin

About 2.0 g of ethyleneglycol diacrylate, about 7.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 18

Ag Precursor+(25% EGDA, 74% EHA) Resin

About 2.5 g of ethyleneglycol diacrylate, about 7.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C.

temperature (program) for about 1 hour using reflow oven under nitrogen with about 500 ppm oxygen.

Example 19

Ag Precursor+(35% EGDA, 64% EHA) Resin

About 3.5 g of ethyleneglycol diacrylate, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 20

Ag Precursor+(50% EGDA, 49% EHA) Resin

About 5.0 g of ethyleneglycol diacrylate, about 4.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 21

Ag Precursor+(15% PEGDA250, 84% EHA) Resin

About 1.5 g of polyethyleneglycol diacrylate Mn 250, about 8.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 22

Ag Precursor+(20% PEGDA250, 79% EHA) Resin

About 2.0 g of polyethyleneglycol diacrylate Mn 250, about 7.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 23

Ag Precursor+(25% PEGDA250, 74% EHA) Resin

About 2.5 g of polyethyleneglycol diacrylate Mn 250, about 7.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 24

Ag Precursor+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 25

Ag Precursor+(50% PEGDA250, 49% EHA) Resin

About 5.0 g of polyethyleneglycol diacrylate Mn 250, about 4.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 26

Ag Precursor+(99% PEGDA250) Resin

About 9.9 g of polyethyleneglycol diacrylate Mn 250 and about 0.1 g of Ethyl (2,4,6-trimethylbenzoyl)phenylphosphinate were added into a 20 mL scintillation vial. The mixture was mixed using a vortex mixer at about 3200 rpm for about 1 minute. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. (program) for about 1 hour using reflow oven under nitrogen with about 500 ppm oxygen.

Example 27

Ag Precursor+(25% TEGDA, 74% EHA) Resin

About 2.5 g of tetraethyleneglycol diacrylate, about 7.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for 1 hour using reflow oven under nitrogen with about 500 ppm oxygen.

Example 28

Ag Precursor+(35% TEGDA, 64% EHA) Resin

About 3.5 g of tetraethyleneglycol diacrylate, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 29

Ag Precursor+(50% TEGDA, 49% EHA) Resin

About 5.0 g of tetraethyleneglycol diacrylate, about 4.9 g of 2-ethylhexylacrylate, and about 0.1 g of Ethyl (2,4,6-trimethylbenzoyl)phenylphosphinate were added into a 20 mL scintillation vial.

The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 30

Ag Precursor+(99% TEGDA) Resin

About 9.9 g of tetraethyleneglycol diacrylate and about 0.1 g of Ethyl (2,4,6-trimethylbenzoyl)phenylphosphinate were added into a 20 mL scintillation vial. The mixture was mixed using a vortex mixer at about 3200 rpm for about 1 minute. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. (program) for about 1 hour using reflow oven under nitrogen with about 500 ppm oxygen.

Example 31

Ag Precursor+(25% PEGDA575, 74% EHA) Resin

About 2.5 g of polyethyleneglycol diacrylate Mn 575, about 7.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 32

Ag Precursor+(35% PEGDA575, 64% EHA) Resin

About 3.5 g of polyethyleneglycol diacrylate Mn 575, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 33

Ag Precursor+(45% PEGDA575, 54% EHA) Resin

About 4.5 g of polyethyleneglycol diacrylate Mn 575, about 5.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 34

Ag Precursor+(50% PEGDA575, 49% EHA) Resin

About 5.0 g of polyethyleneglycol diacrylate Mn 575, about 4.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 35

Ag Precursor+(65% PEGDA575, 34% EHA) Resin

About 6.5 g of polyethyleneglycol diacrylate Mn 575, about 3.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 36

Ag Precursor+(25% PEGDA700, 74% EHA) Resin

About 2.5 g of polyethyleneglycol diacrylate Mn 700, about 7.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 37

Ag Precursor+(35% PEGDA700, 64% EHA) Resin

About 3.5 g of polyethyleneglycol diacrylate Mn 700, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 38

Ag Precursor+(50% PEGDA700, 49% EHA) Resin

About 5.0 g of polyethyleneglycol diacrylate Mn 700, about 4.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 39

Ag Precursor+(60% PEGDA700, 39% EHA) Resin

About 6.0 g of polyethyleneglycol diacrylate Mn 700, about 3.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 40

Ag Precursor+(80% PEGDA700, 19% EHA) Resin

About 8.0 g of polyethyleneglycol diacrylate Mn 700, about 1.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for 2 minutes at 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 41

Ag Precursor+(99% PEGDA700) Resin

About 9.9 g of polyethyleneglycol diacrylate Mn 700 and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 42

Ag Precursor+(35% 1,4-butanediol diacrylate, 64% EHA) Resin

About 3.5 g of 1,4-butanediol diacrylate, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 43

Ag Precursor+(50% 1,4-butanediol diacrylate, 4.9% EHA) Resin

About 5.0 g of 1,4-butanediol diacrylate, about 4.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 44

Ag Precursor+(65% 1,4-butanediol diacrylate, 34% EHA) Resin

About 6.5 g of 1,4-butanediol diacrylate, about 3.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 45

Ag Precursor+(35% 1,6-hexanediol diacrylate, 64% EHA) Resin

About 3.5 g of 1,6-hexanediol diacrylate, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 46

Ag Precursor+(50% 1,6-hexanediol diacrylate, 4.9% EHA) Resin

About 5.0 g of 1,6-hexanediol diacrylate, about 4.9 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 47

Ag Precursor+(65% 1,6-hexanediol diacrylate, 34% EHA) Resin

About 6.5 g of 1,6-hexanediol diacrylate, about 3.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for 1 hour using reflow oven under nitrogen with about 500 ppm oxygen.

Example 48

Ag Precursor+(50% 1,6-hexanediol diacrylate, 49% EGMEA) Resin

About 5.0 g of 1,6-hexanediol diacrylate, about 4.9 g of ethyleneglycol methyl ether acrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 49

Ag Precursor+(25% DTMPTA, 74% EHA) Resin

About 2.5 g of di(trimethylolpropane)tetraacrylate, about 7.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

The results of testing certain formulations described above in 3D printing processes are summarized below in Table 1.

TABLE 1

Summary of Examples of 3D printing GRIN devices that generate functionally graded compositions defined by the concentrations of about 35% to about 80% mol difunctional cross-linking agent of the resin mixture or about 10% to about 50% mol tetrafunctional cross-linking agent of the resin mixture.

| Example No. | Functional component | Resin | % mol cross-linking agent | Processing | Comment |
|---|---|---|---|---|---|
| 19 | AgND + EtOxa (7.9% Ag metal) | 35% wt. EGDA, 64% wt. EHA, 1% wt. TPO-L | 37 | 1) SLA printing 2) thermal sintering | Conducting GRIN devices 37 Ω/cm |

TABLE 1-continued

Summary of Examples of 3D printing GRIN devices that generate functionally graded compositions defined by the concentrations of about 35% to about 80% mol difunctional cross-linking agent of the resin mixture or about 10% to about 50% mol tetrafunctional cross-linking agent of the resin mixture.

| Example No. | Functional component | Resin | % mol cross-linking agent | Processing | Comment |
|---|---|---|---|---|---|
| 20 | AgND + EtOxa (7.9% Ag metal) | 50% wt. EGDA, 49% wt. EHA, 1% wt. TPO-L | 52 | 1) SLA printing 2) thermal sintering | Non-Conducting GRIN devices |
| 25 | AgND + EtOxa (7.9% Ag metal) | 50% wt. PEGDA250, 49% wt. EHA, 1% wt. TPO-L | 43 | 1) SLA printing 2) thermal sintering | Conducting GRIN devices 7.6 Ω/cm |
| 29 | AgND + EtOxa (7.9% Ag metal) | 50% wt. TEGDA, 49% wt. EHA, 1% wt. TPO-L | 40 | 1) SLA printing 2) thermal sintering | Conducting GRIN devices 13.16 Ω/cm |
| 35 | AgND + EtOxa (7.9% Ag metal) | 65% wt. PEGDA575, 34% wt. EHA, 1% wt. TPO-L | 50 | 1) SLA printing 2) thermal sintering | Conducting GRIN devices 21.04 Ω/cm |
| 38 | AgND + EtOxa (7.9% Ag metal) | 50% wt. PEGDA700, 49% wt. EHA, 1% wt. TPO-L | 32 | 1) SLA printing 2) thermal sintering | Conducting GRIN devices 12.55 Ω/cm |
| 39 | AgND + EtOxa (7.9% Ag metal) | 60% wt. PEGDA700, 39% wt. EHA, 1% wt. TPO-L | 42 | 1) SLA printing 2) thermal sintering | Conducting GRIN devices 28.44 Ω/cm |
| 40 | AgND + EtOxa (7.9% Ag metal) | 80% wt. PEGDA700, 19% wt. EHA, 1% TPO-L | 68 | 1) SLA printing 2) thermal sintering | Conducting GRIN devices 25.94 Ω/cm |
| 43 | AgND + EtOxa (7.9% Ag metal) | 50% wt. BDDA, 49% wt. EHA, 1% wt. TPO-L | 48 | 1) SLA printing 2) thermal sintering | Conducting GRIN devices 7.24 Ω/cm |
| 44 | AgND + EtOxa (7.9% Ag metal) | 65% wt. BDDA, 34% wt. EHA, 1% wt. TPO-L | 69 | 1) SLA printing 2) thermal sintering | Conducting GRIN devices 100-500 Ω/cm |
| 46 | AgND + EtOxa (7.9% Ag metal) | 50% wt. HDDA, 49% wt. EHA, 1% wt. TPO-L | 45 | 1) SLA printing 2) thermal sintering | Conducting GRIN devices 2.9 Ω/cm |
| 47 | AgND + EtOxa (7.9% Ag metal) | 65% wt. HDDA, 34% wt. EHA, 1% TPO-L | 65 | 1) SLA printing 2) thermal sintering | Conducting GRIN devices 37.4 Ω/cm |
| 48 | AgND + EtOxa (7.9% Ag metal) | 50% wt. HDDA, 49% wt. EGMEA, 1% wt. TPO-L | 50 | 1) SLA printing 2) thermal sintering | Conducting GRIN devices 112 Ω/cm |
| 49 | AgND + EtOxa (7.9% Ag metal) | 25% wt. DTMPTA, 74% wt. EHA, 1% wt. TPO-L | 16 | 1) SLA printing 2) thermal sintering | Conducting GRIN devices KΩ/cm |
| 50 | 2.5% TiO$_2$ functionalized with 2-methoxy(poly ethyleneoxy) propyl trimethoxysilane | 35% wt. PEGDA250, 64% wt. EHA, 1% wt. TPO-L | 29 | 1) SLA printing 2) thermal sintering | GRIN devices |
| 51 | 2.5% TiO$_2$ functionalized with 2-methoxy(poly ethyleneoxy) propyl trimethoxysilane | 35% wt. PEGDA250, 61.7% wt. EHA, 1% wt. TPO-L, toluene | 29 | 1) SLA printing 2) thermal sintering | GRIN devices |

With reference to the Examples 16-53, changes in morphology as a function of cross-linking agent concentrations for resins containing non-polymerizing functional and/or functional precursor components were observed. Where the non-polymerizing functional precursor component was silver neodecanoate, it may be converted to silver post printing by heating to elevated temperatures. Other examples include non-polymerizing functional nanoparticles, such as $TiO_2$, $F_2O_3$ and ZnO.

3D Printing of Polymer-Silver Structures.

Figure 9:
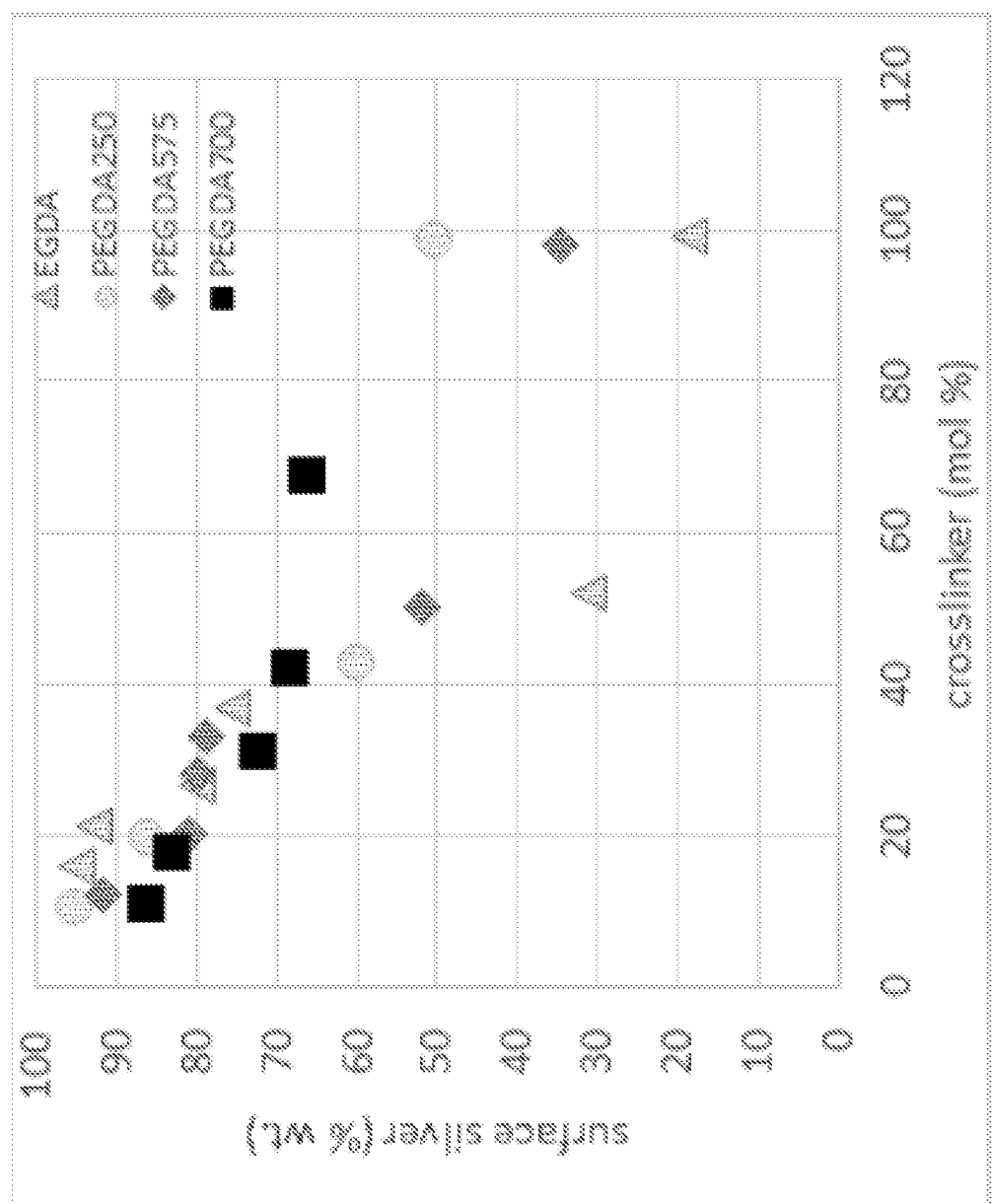
FIG. 9 shows the surface concentration of silver of 3D printed GRIN devices made from resins with varying amounts of cross-linking agents. The formulations used to make these GRIN devices are described in Examples 16-26 and 31-41.
Figure 10:
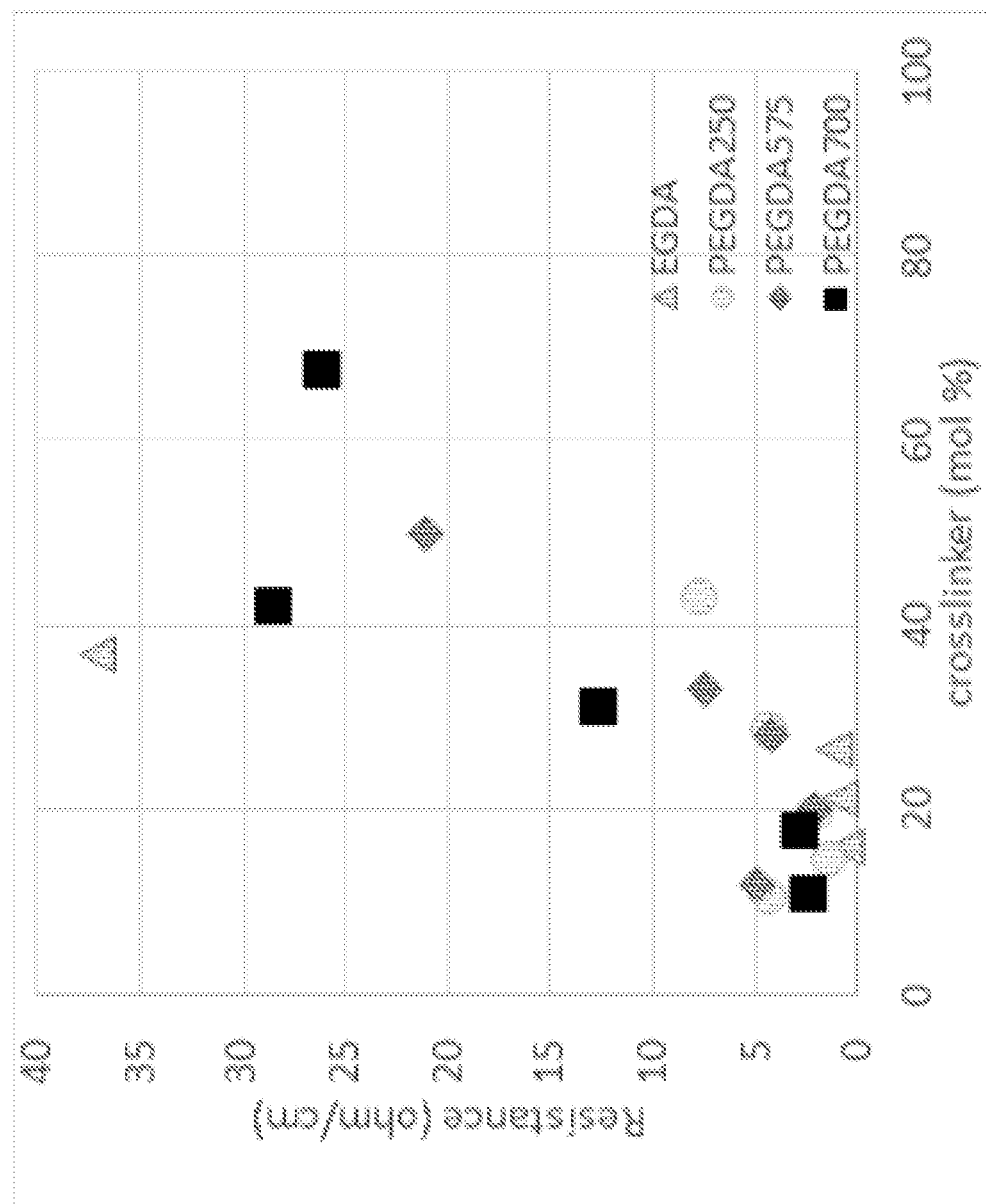
FIG. 10 shows the resistance of the silver coating on 3D printed GRIN devices made from resins with varying amounts of cross-linking agents. The formulations used to make these GRIN devices are described in Examples 16-26 and 31-41.

Using a difunctional cross-linking agent (e.g. EGDA, PEGDA250, PEGDA575 and PEGDA700), various morphologies in the printed GRIN device may be formed depending on the concentration of cross-linking agent. FIG. 9 shows the amount of silver (% wt) at the surface decreased with increased concentration of cross-linking agent. The concentration of silver at the surface can determine the resistance value of the printed GRIN device. As the concentration of cross-linking agent increases, the resistance of the silver coating increases due to the lower concentration of silver at the surface (FIG. 10).

Example 50

$TiO_2$+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. To this vial, about 0.25 g of $TiO_2$ functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 51

$TiO_2$+(35% PEGDA250, 64% EHA and toluene) Resin

About 3.5 g of polyethyleneglycol diacrylate Mn 250, about 6.17 g of 2-ethylhexylacrylate, about 2.3 ml toluene and about 0.1 g of Ethyl (2,4,6-trimethylbenzoyl)phenylphosphinate were added into a 20 mL scintillation vial. The mixture was mixed using a vortex mixer at about 3200 rpm for about 30 seconds. To this vial, about 0.25 g of $TiO_2$ functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 12:
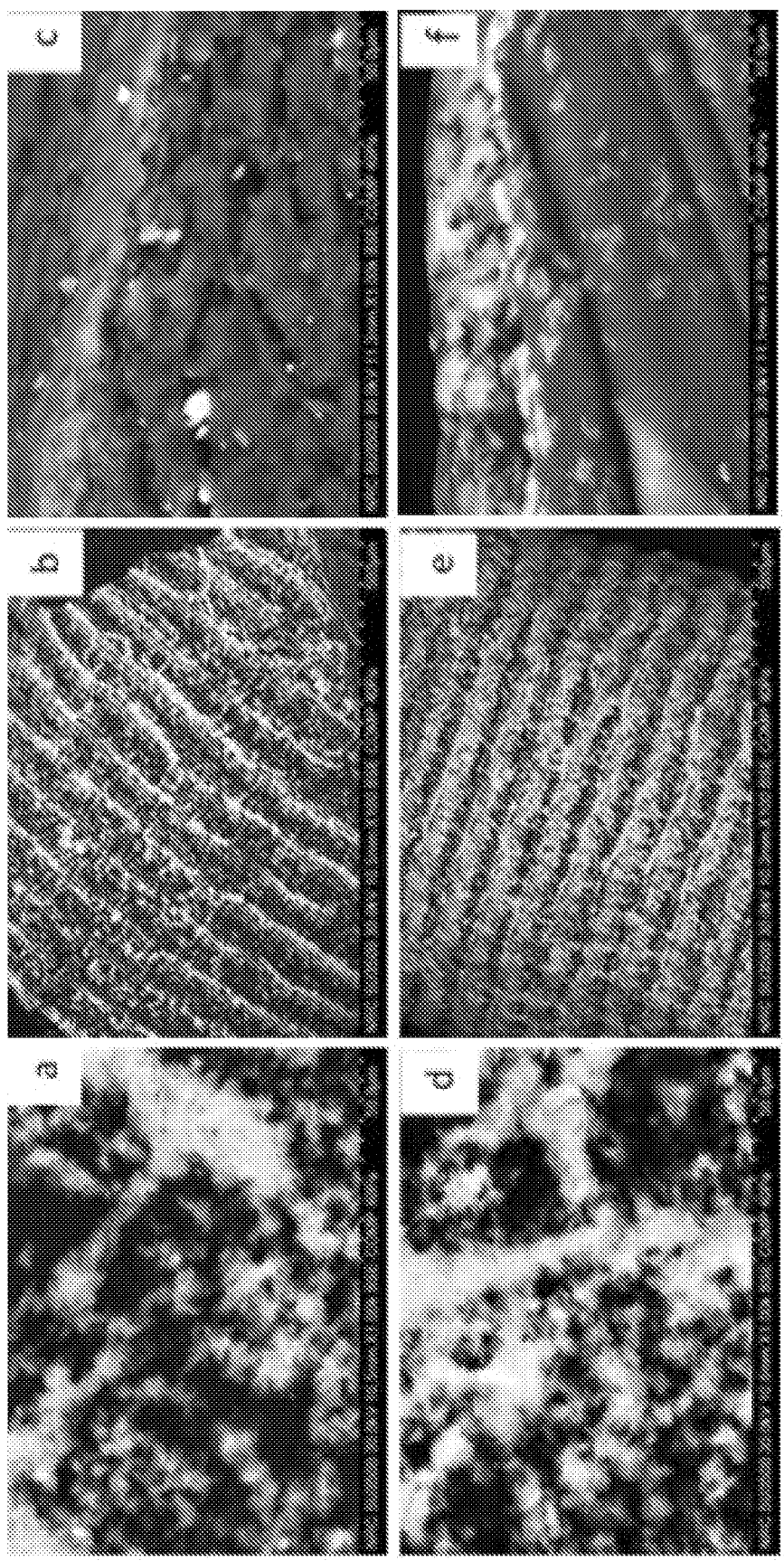
FIG. 12 shows SEM images of example 3D $TiO_2$ GRIN lenses printed without toluene (a, b and c) and with toluene (d, e and f).
Figure 13:
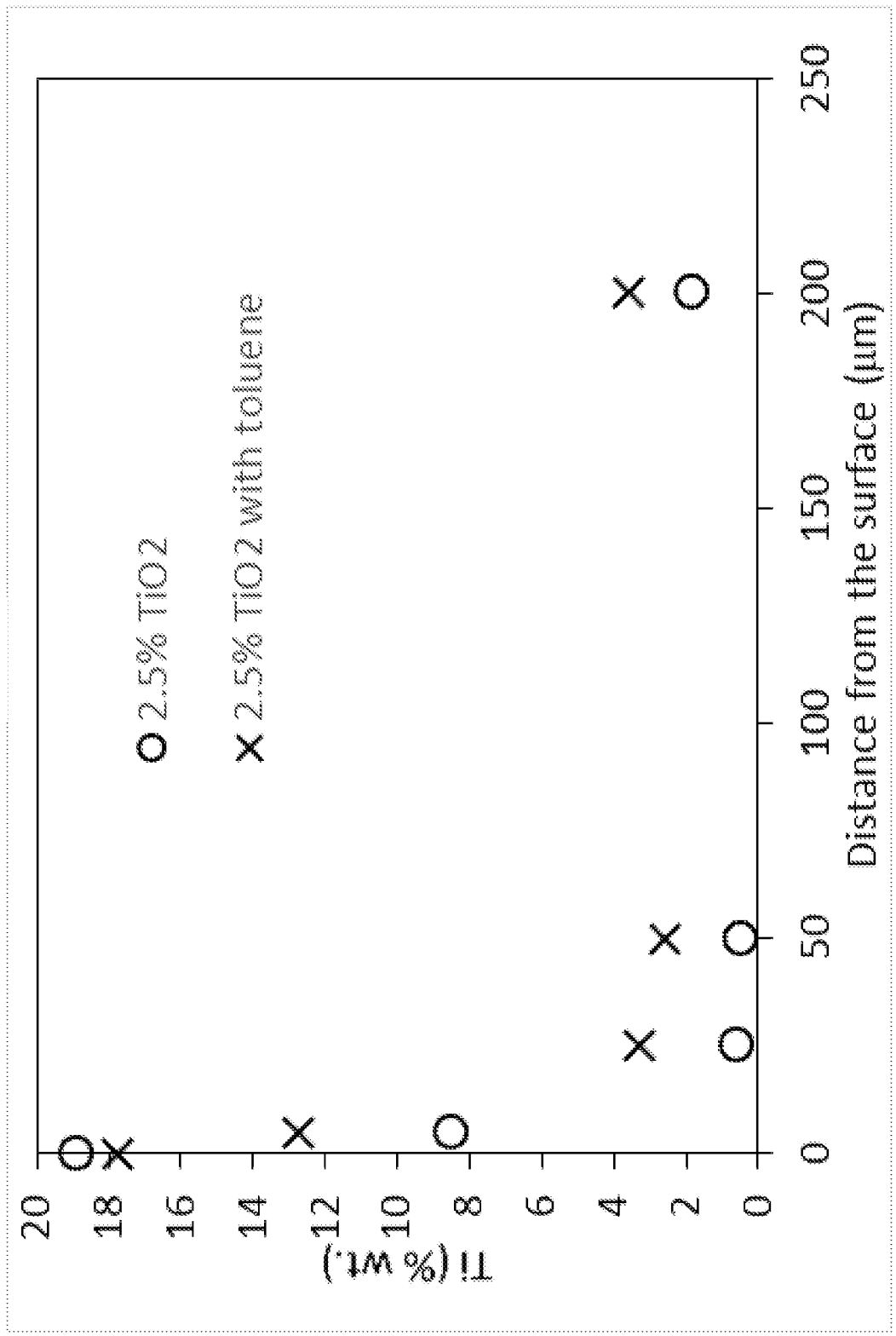
FIG. 13 shows wt % of $TiO_2$ as a function of distance from the surface of the 3D $TiO_2$ GRIN lenses (printed with toluene) of FIG. 12.
Figure 14:
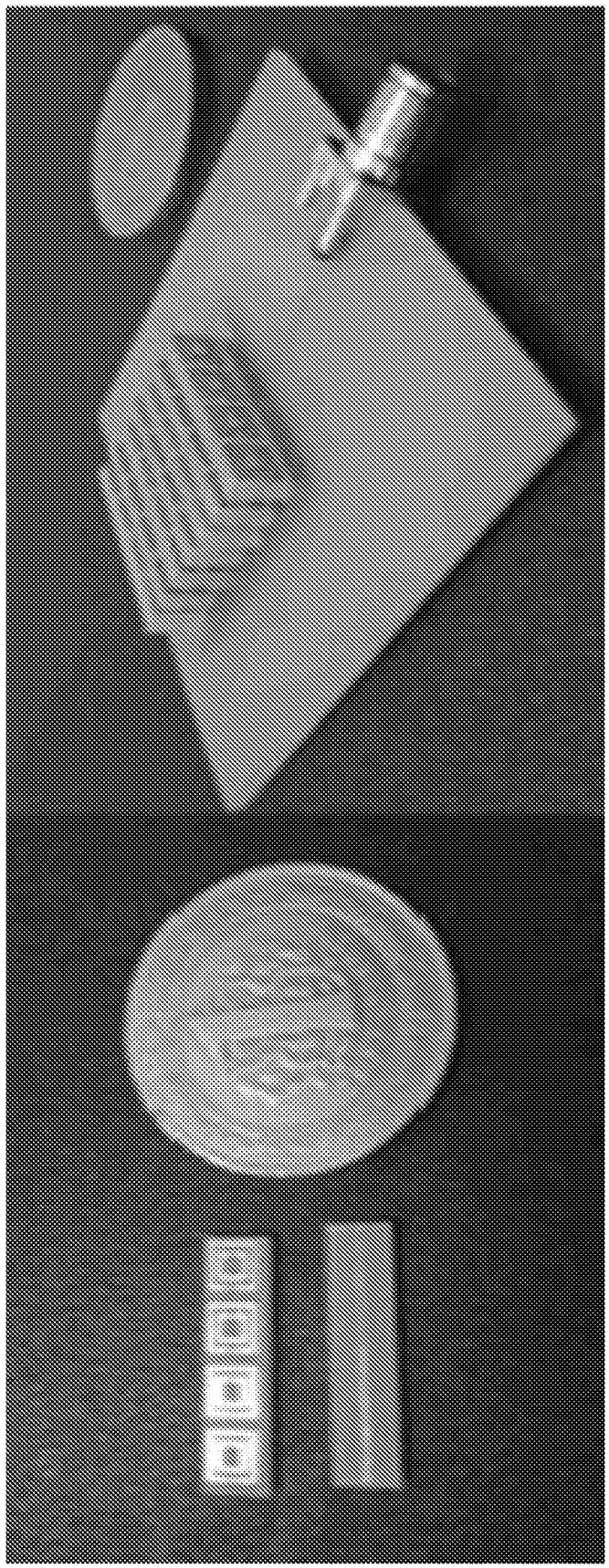
FIG. 14 shows images of example split ring resonators used to focus radiation from an example microstrip patch antenna.

FIG. 12 shows SEM images of 3D $TiO_2$ GRIN lenses printed without toluene (a, b and c) and with toluene (d, e and f). The 3D $TiO_2$ GRIN lenses were prepared using the formulations described in Examples 50 and 51. FIG. 13 shows wt % of $TiO_2$ as a function of distance from the surface of the 3D $TiO_2$ GRIN lenses. The 3D $TiO_2$ GRIN lenses were prepared using the formulations described in Examples 50 and 51. FIGS. 12 and 13 show examples of formation of gradient structures. Tuning the $TiO_2$ composition forms a gradient in the refractive index of the material. FIG. 12, panel f shows an electron microscope image in backscattered mode showing the concentration gradient of $TiO_2$, with the concentration of $TiO_2$ at its highest at the outer surface (lighter area) and decreasing as a function of the distance from the surface of the cylinder (dark area). FIG. 13 shows an EDS (Energy-dispersive X-ray spectroscopy) analysis of the composition of the cross-section of the cylinder shown in FIG. 12. The concentration of $TiO_2$ is high at the surface of the cylinder and progressively decreases as a function of distance away from the surface of the cylinder. $TiO_2$/polymer composite and graded structure can also be used as dielectric material in the antenna where effective permittivity and extremely low loss may be required.

Example 52

Figure 15:
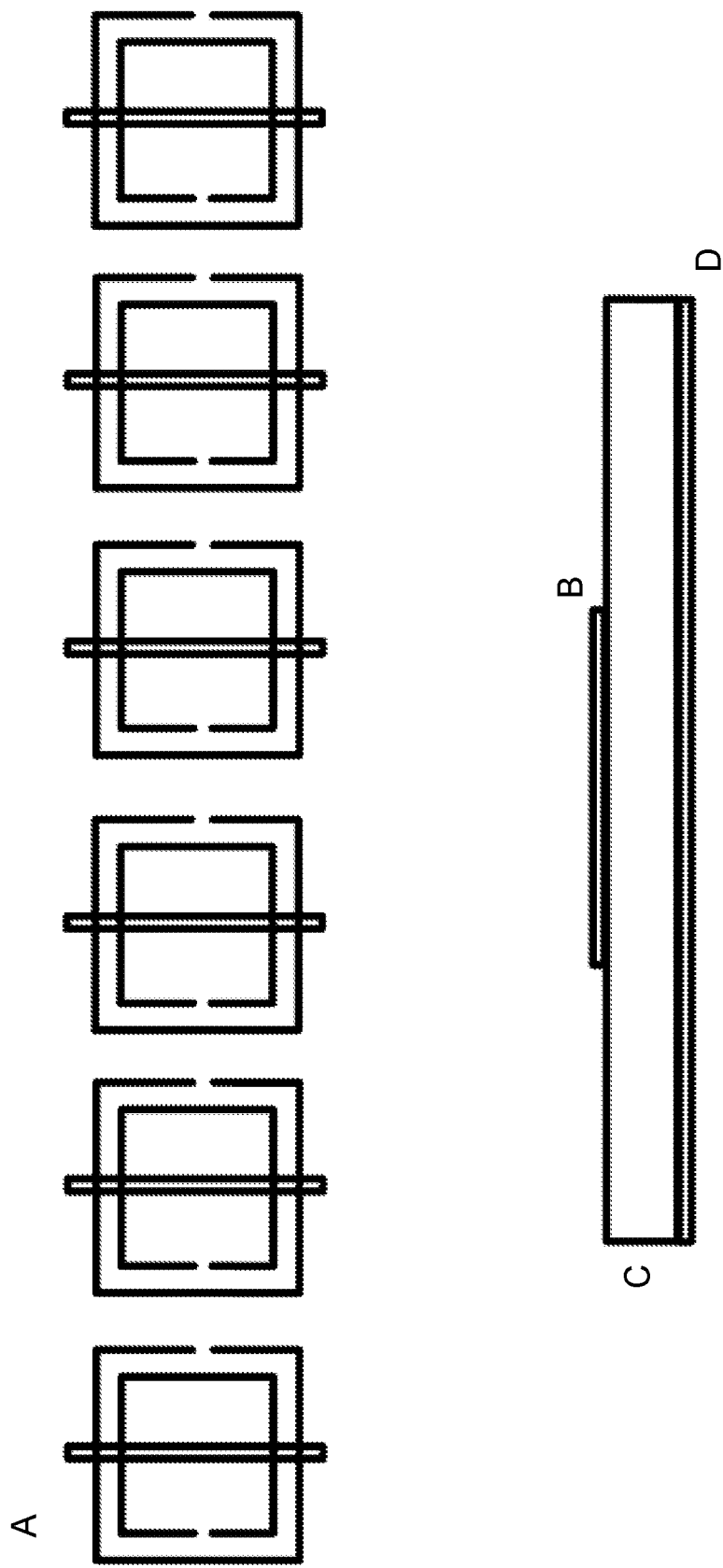
FIG. 15 shows an example metamaterial lens setup.
Figure 16A:
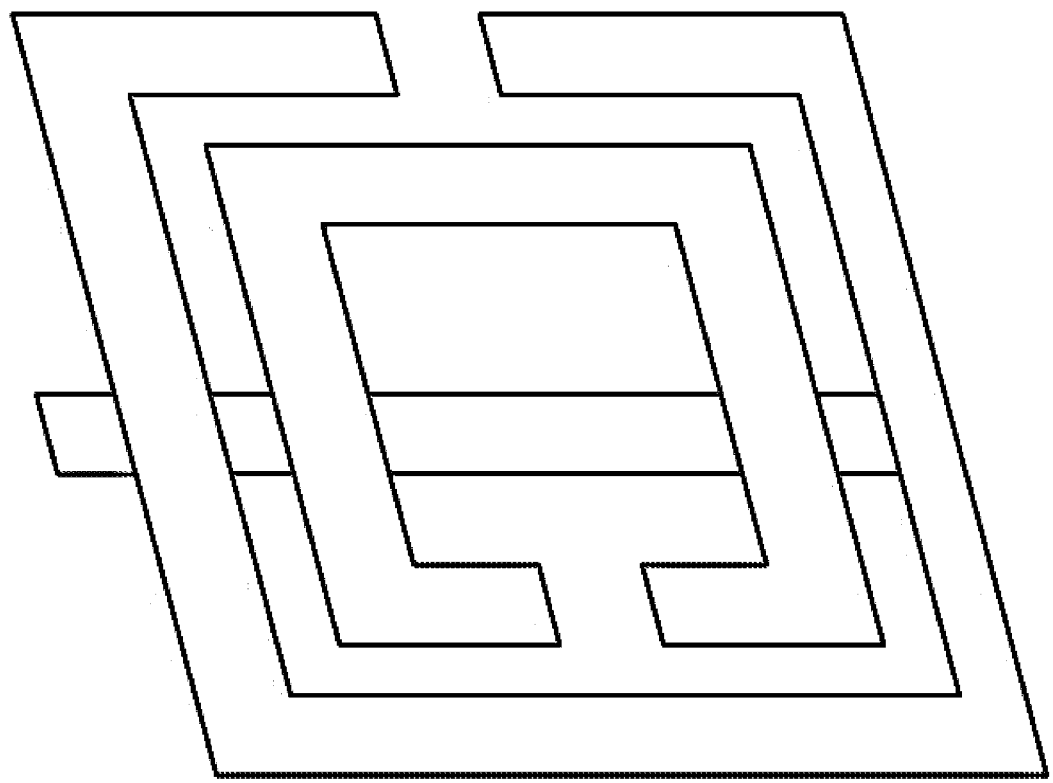
FIG. 16A shows an example 2D design for a planar split ring resonator.
Figure 16B:
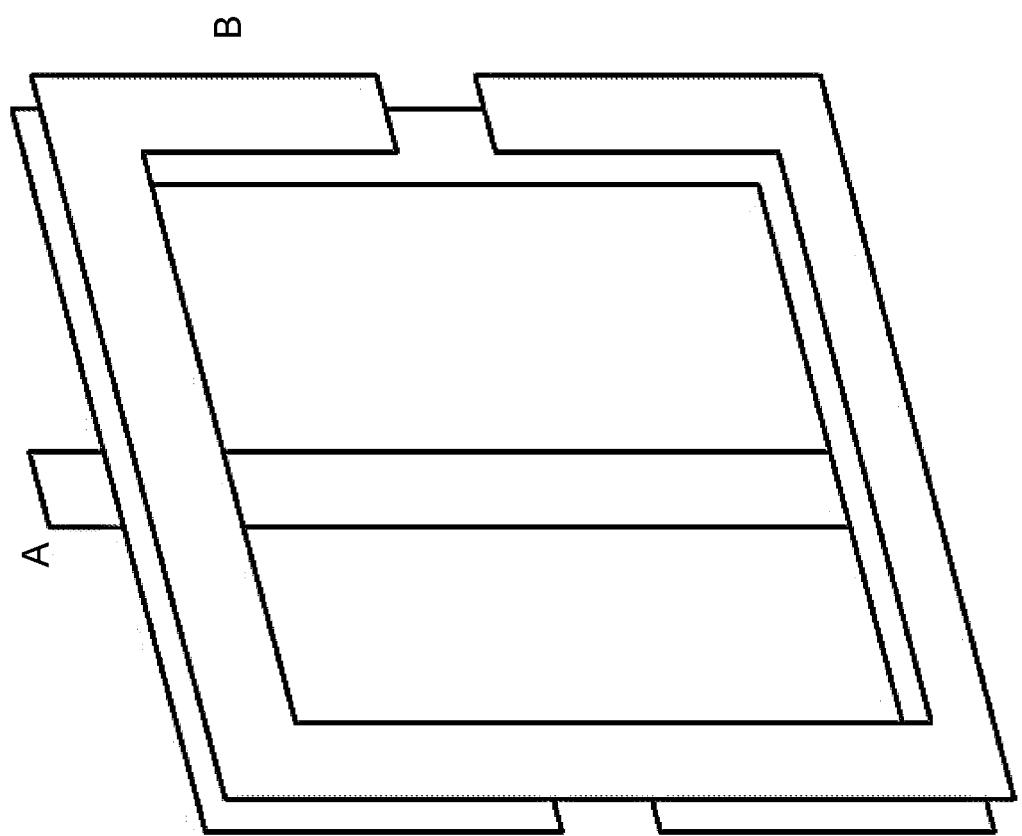
FIG. 16B shows an example of a split ring resonator extended from planar to 3D.

Radio Frequency Lensing with Left-Hand (Negative Refractive Index) Materials Such as Split Ring Resonators The radiation pattern of an antenna can be enhanced by the use of metallic structures commonly known as metamaterials. These metallic structures can be ended into a dielectric substrate and placed in the vicinity of an antenna to focus the radiated energy. An example of these structures is the split ring resonator which may be used for lensing in a 2-dimensional planer structure, for example as described in the following references which are incorporated herein by reference in their entirety: C. Pan, M. Ng Mou Kehn and O. Quevedo-Teruel, "Microwave focusing lenses by synthesized with positive or negative refractive index split-ring resonator metamaterials," 2015 International Workshop on Electromagnetics: Applications and Student Innovation Competition (iWEM), Hsinchu, 2015, pp. 1-2, doi: 10.1109/iWEM.2015.7365057; and E. DOOAN, E. UNAL*, D. KAPUSUZ, New generation WIMAX antenna based on metamaterial, Electric-Electronic Engineering Department, University of Mustafa Kemal, Iskenderun, Hatay, Turkiye. This is an example of using split ring resonators to enhance the gain of an antenna as a superstrate. This demonstrates using 2-dimensional fabrication techniques to focus radiation from an antenna through physical connection with the antenna. The radiation from an antenna can also be focused by placing split ring resonators (or other metamaterials) in the vicinity of the antenna in free space. FIG. 15 shows an illustration of split ring resonators placed in the vicinity of an antenna to act as a lens. The split ring resonators are labeled (A) and produce a negative refractive index at the desired frequency of operation to focus radiation from the antenna. The antenna is labeled (B) and is the main component responsible for radiation. The substrate for the antennas is labeled (C) and is a physical structure used to support the antenna. It is often comprised of dielectric material which can store electrical energy and determine the impedance of the antenna. The ground plane is labeled as (D) and acts as a return path for current from the antenna. The 3-dimensional printing process may allow for these structures to be extended beyond the planar surface and increasing the coupling to make either higher order responses and/or increased quality factor for lower loss. FIG. 16A shows an example 2D design for a planar split ring resonator, and FIG. 16B shows an example of a split ring resonator be extended from planar (2D) to 3D. The split ring resonators shown in 16B have more surface area between them than their counterparts in 16A creating a potential for more capacitance with rings of smaller radius. The transmission line labeled (A) conducts current and stores magnetic energy. The split ring resonators labeled (B) can build up a voltage between rings and between the end gaps to store electrical energy. These two sides of the device can operate together to produce a negative refractive index at a given design frequency.

Example 53

Rotman Lens with Graded Index Parallel Plate Region for Phased Array Beamforming Rotman lens designs may use a homogeneous dielectric as the medium of propagation causing the only design variable to be the positioning of the input and output ports, as described in the following references which are incorporated herein by reference in their entirety: G. Tudosie and R. Vahldieck, "An LTCC-Based folded Rotman lens for phased array applications," 2006 Asia-Pacific Microwave Conference, Yokohama, 2006, pp. 2106-2109, doi: 10.1109/APMC.2006.4429828; W. Rotman and R. Turner, "Wide-angle microwave lens for line source applications," in IEEE Transactions on Antennas and Propagation, vol. 11, no. 6, pp. 623-632, November 1963, doi: 10.1109/TAP.1963.1138114; and P. Turalchuk, I. Munina and A. Shitvov, "Analog Beamforming Based on Fourier Rotman Lens for Multibeam Applications," 2018 48th European Microwave Conference (EuMC), Madrid, 2018, pp. 1573-1576, doi: 10.23919/EuMC.2018.8541739. A diagram of an example lens in shown in FIG. 17. By printing the dielectric substrate its permittivity could be varied across the parallel plate region to add another design variable. This would make the Rotman lens a graded index lens.

What is claimed is:

1. A GRIN (graded-index) device comprising:
   i) a first phase comprising at least one polymer formed by vat polymerization of a substantially homogeneous mixture of a monomer and at least one first component;
   ii) a second phase comprising the at least one first component; and,
   iii) an interface between the first phase and the second phase, wherein the interface has a uniform concentration gradient of the at least one first component, whereby the concentration of the at least one first component decreases with distance away from the second phase towards the first phase,
   whereby as the vat polymerization occurs, the at least one first component diffuses away from a focused region of polymerization in the mixture thereby forming in the GRIN device the interface having the uniform concentration gradient of the at least one first component,
   wherein the at least one first component comprises at least one functional component, at least one functional precursor component, or combinations thereof, and
   wherein the device is a functional device, a functional precursor device, or a combination of a functional and functional precursor device.

2. The device of claim 1, wherein the device is a lens, an antenna or both a lens and an antenna.

3. The device of claim 1, wherein the device has one or more of a permittivity in a range of 1 to 5, a dielectric constant in a range of 1 to 5, a dielectric loss in a range of 0 to 10%, a dielectric loss tangent in a range of 0.0001 to 0.05 and a gain in a range of 0 to 6 dB.

4. The device of claim 1, wherein each phase has a gradient of continuous variations in refractive index.

5. The device of claim 1, wherein the at least one first component comprises one or more of ceramic particles and ceramic precursors.

6. The device of claim 5, wherein the ceramic is one or more of $BaTiO_3$ (BT), $Pb(Mg_{1/3}Nb_{2/3})O_3$ (PMN), $Pb(Zr_{0.52}Ti_{0.48})O_3$ (PZT), piezoelectric crystals (PMN-PT), barium strontium titanate (BST), $BaTi_4O_9$—ZnO, $ZnFe_2O_4$, $CaCu_3Ti_4O_{12}$, a $ZnAl_2O_4$—$TiO_2$-based material, a $Mg_2SiO_4$-based material, a $Mg_4Ta_2O_9$-based material, an $Al_2O_3$-based material and any other metal oxides.

7. The device of claim 1, wherein the at least one first component comprises one or more of a ferroelectric material, a ferromagnetic material, an integrated circuit, a piezoelectric nanoparticle and a quantum dot.

8. The device of claim 1, wherein the at least one first component comprises embedded graphene periodic structures, carbon nanotubes and boron nitride nanotubes.

9. The device of claim 1, wherein the at least one first component comprises one or more of a metal, a metal precursor, a metalloid and a metalloid precursor selected from the group consisting of metal salts, metal oxides, metal coordination compounds, organometallic compounds, organometalloid compounds and combinations thereof.

10. The device of claim 1, wherein the at least one first component comprises one or more of a metal formate, a metal acetate, a metal propionate, a metal butyrate, a metal pentanoate, a metal hexanoate, a metal heptanoate, a metal ethylhexanoate, a metal behenate, a metal benzoate, a metal oleate, a metal octanoate, a metal nonanoate, a metal decanoate, a metal neodecanoate, a metal hexafluoroacetylacetonate, a metal phenylacetate, a metal isobutyrylacetate, a metal benzoylacetate, a metal pivalate and a metal oxalate, and the metal is one or more of aluminum, silver, gold, platinum, titanium and copper.

11. The device of claim 1, wherein the at least one first component is at least one second polymer.

12. The device of claim 11, wherein the second polymer comprises one or more of a conducting polymer, a porous polymer and a polymer foam.

13. The device of claim 1, wherein concentration of the at least one polymer in the interface decreases with distance away from the first phase towards the second phase.

14. The device of claim 1, wherein the second phase is one or more of a concentration gradient, a coating and a composite.

* * * * *